(12) United States Patent
Cariño, Jr. et al.

(10) Patent No.: US 6,651,072 B1
(45) Date of Patent: *Nov. 18, 2003

(54) METHOD AND APPARATUS FOR PROVIDING SHARED DATA TO A REQUESTING CLIENT

(75) Inventors: Felipe Cariño, Jr., Pasadena, CA (US); Anthony L. Rollins, San Diego, CA (US)

(73) Assignee: NCR Corporation, Dayton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/143,990

(22) Filed: Aug. 31, 1998

Related U.S. Application Data

(63) Continuation of application No. 08/546,466, filed on Oct. 20, 1995, now Pat. No. 5,930,786.

(51) Int. Cl.[7] .............................................. G06F 17/30
(52) U.S. Cl. .............................. 707/104; 707/10; 707/9; 707/4; 707/3; 707/103
(58) Field of Search .............................. 707/4, 10, 103, 707/104; 395/200.48, 200.79; 709/203

(56) References Cited

U.S. PATENT DOCUMENTS

| | | | |
|---|---|---|---|
| 4,558,413 A | 12/1985 | Schmidt et al. | |
| 5,014,125 A | 5/1991 | Pocock et al. | ............... 348/7 |
| 5,181,162 A | 1/1993 | Smith et al. | |
| 5,369,778 A | 11/1994 | San Soucie et al. | |
| 5,377,323 A | 12/1994 | Vasudevan | |
| 5,398,336 A | 3/1995 | Tantry et al. | ............... 707/103 |
| 5,408,655 A | 4/1995 | Oren et al. | |
| 5,414,837 A | * 5/1995 | Kotatsu | |
| 5,442,389 A | 8/1995 | Blahut et al. | ............... 348/7 |
| 5,442,749 A | 8/1995 | Northcutt et al. | ...... 395/200.49 |
| 5,448,727 A | * 9/1995 | Annevelink | |
| 5,455,953 A | 10/1995 | Russell | |
| 5,457,797 A | 10/1995 | Bitterworth et al. | ........ 395/682 |
| 5,488,412 A | 1/1996 | Majeti et al. | |
| 5,511,002 A | 4/1996 | Milne et al. | |
| 5,513,126 A | 4/1996 | Harkins et al. | |
| 5,534,913 A | 7/1996 | Majeti et al. | ............... 348/7 |
| 5,548,587 A | 8/1996 | Bailey et al. | |
| 5,548,749 A | 8/1996 | Kroenke et al. | |
| 5,548,756 A | 8/1996 | Tantry et al. | ............... 707/10 |
| 5,555,365 A | 9/1996 | Selby et al. | |
| 5,555,403 A | 9/1996 | Cambot et al. | |
| 5,557,518 A | 9/1996 | Rosen | |
| 5,557,798 A | 9/1996 | Skeen et al. | |
| 5,560,005 A | 9/1996 | Hoover et al. | |
| 5,564,113 A | 10/1996 | Bergen et al. | |

(List continued on next page.)

OTHER PUBLICATIONS

Woo et al., "Authentication for Distributed Systems," Computer Magazine, v25, n1, Jan. 1992, pp. 39–52.

(List continued on next page.)

*Primary Examiner*—Jean M. Corrielus
(74) *Attorney, Agent, or Firm*—Gates & Cooper

(57) ABSTRACT

A method and apparatus for providing object data stored in a database management system to a receiving client. The method comprises the steps of receiving a database query from the client on a first communication path, transforming the database query into database management system commands, transmitting the database management system commands to the database management system, receiving a response from the database management system, the response comprising an object locator identifying data responsive to the database query, compiling an answer set comprising the database management system response, transmitting the answer set to the client on the first communications path, receiving a data request from the client comprising the media object locator, establishing a transport session with the client on a second communication path, and transmitting data identified by the media object locator to the client on the second communication path.

12 Claims, 15 Drawing Sheets

U.S. PATENT DOCUMENTS

| | | | |
|---|---|---|---|
| 5,581,758 A | 12/1996 | Burnett et al. | |
| 5,596,744 A | 1/1997 | Dao et al. | 707/10 |
| 5,615,337 A | 3/1997 | Zimowski et al. | |
| 5,623,660 A | 4/1997 | Josephson | 707/9 |
| 5,630,124 A | 5/1997 | Coyle, Jr. et al. | 707/103 |
| 5,632,015 A | 5/1997 | Zimowski et al. | |
| 5,632,017 A | 5/1997 | Klein et al. | 395/200.79 |
| 5,640,556 A | 6/1997 | Tamura | 707/10 |

OTHER PUBLICATIONS

Ganesan, Ravi, "Yaksha: Augmenting Kerberos with Public Key Cryptography," Network and Distributed System Security, 1995 Symposium, pp. 132–143.

Geng–Sheng, "A New Generalized Mechanism of Secure Internetworked Information Service Creation for Future Personal Communications Networks, Information Engineering," IEEE Singapore International Conference on Networks, Jun. 1995, pp. 60–71.

Wolski, Antoni, "LINDA: A System for Loosely Integrated Database", Data Engineering, 1989 $5^{th}$ International Conference Pub: IEEE.

Wang, Richard Y. et al., "Inter–Database Instance Identification in Composite Information Systems", Systems Sciences, 1989 Annual Hawaii International Conference, vol. III, Pub: IEEE, pp. 677–684.

Wang, Richard Y. et al., "Inter–Database Instance Identification Problem in Integrating Autonomous Systems", Data Engineering, 1989 $5^{th}$ International Conference, Pub: IEEE.

Holden, Russ, "Digital's DB Integrator: A Commercial Multi–Database Management System", Parallel and Distributed Information Systems, 1994 International Conference, Pub: IEEE.

Tjaden, Gary et al, "Integrated Network Management for Real–Time Operations", IEEE Network Magazine, pp. 10–15.

Chen et al, "The Design and Implementation of a Full-Fledged Multiple DBMS", Data Engineering, 1995, $11^{th}$ International Conference, Pub: IEEE.

Dennis Heimbigner and Dennis McLeod, "A Federated Architecture for Information Management", ACM Transactions on Office Information Sytsems, vol. 3, No. 3, Jul. 1985, pp. 253–278.

Amit P. Sheth, James A. Larson; "Federated Database Systems for Managing Distributed, Heterogeneous, and Autonomous Databases", ACM Computing Surveys, vol. 22, No. 3, Sep. 1990, pp. 183–236.

Jeff Chase, Hank Levy and Ashutosh Tiwary; "Using Virtual Addresses as Object References," IEEE, 1992, pp. 245–248.

Kevin Wilkinson, Peter Lyngbaek and Waqar Hasan; "The Iris Architecture and Implemention", IEEE Transactions on Knowledge and Data Engineering, vol. 2, No. 1, Mar. 1990, pp. 63–75.

B. Clifford Neuman and Theodore Ts'o; "Kerberos: An Authentication Service for Computer Networks," IEEE Communications Magazine, Sep. 1994, pp. 33–38.

Claudio Calvelli, Vijay Varadharajan; "An Analysis of Some Delegation Protocols for Distributed Systems," IEEE, 1992, pp. 92–110.

Alexandros Biliris, Euthimios Panagos; "EOS User's Guide", Release 2.0, AT&T Bell Laboratories, Murray Hill, NJ, May 5, 1993, pp. i–iv; 1–60.

Felipe Cariño, Jr., "Hetero Heterogeneous DBMS Frontend", Office Systems: Methods and Tools, Elsevier Science Publishers B.V. (North–Holland) © IFIP, 1987, pp. 159–172.

Alfonso F. Cardenas, Ion Tim Ieong, Ricky K. Taira, Roger Barker, Claudine M. Breant; "The Knowledge–Based Object–Oriented PICQUERY+ Language," IEEE Transactions on Knowledge and Data Engineering, vol. 5, No. 4, Aug. 1993, pp. 644–657.

Felipe Cariño and Pekka Kostamaa, "Exegesis of DBC/1012 and P–90—Industrial Supercomputer Database Machine," Teradata Advanced Concepts Laboratory (TACL), El Segundo, CA, 1992, 14 pages.

Felipe Cariño, Jr., Warren Sterling and Pekka Kostamaa; "Industrial Database Supercomputer Exegesis: The DBC/1012, The NCR 3700, The Ynet, and the Bynet," Teradata Advanced Concepts Laboratory, El Segundo, CA, 1994, pp. 139–157.

Wesley W. Chu, Fellow, IEEE, and Ion Tim Ieong, "A Transaction–Based Approach to Vertical Partitioning for Relational Database Systems," IEEE Transactions on Software Engineering, vol. 19, No. 8, Aug. 1993, pp. 804–812.

Dave Mandelkem, "GUIs The Next Generation," Communications of the ACM, Apr. 1993, vol. 36, No. 4, pp. 37–39.

Alan Morse and George Reynolds, "Overcoming Current Growth Limits in UI Development," Communications of the ACM, Apr. 1993, vol. 36, No. 4, pp. 73–81.

Amit P. Sheth and James A. Larson, "Federated Database Systems for Managing Distributed, Heterogeneous and Autonomous Databases," ACM Computing Surveys, vol. 22, No. 3, Sep. 1990, pp. 183–236.

Andrew Wtikowski, Felipe Cariño and Pekka Kostamaa, "NCR 3700—The Next–Generation Industrial Database Computer," Proceeding of the $19^{th}$ VLDB Conference, Dublin, Ireland, 1993, pp. 230–243.

Leonard Gallagher and Joan Sullivan, "Database Language SQL: Integrator of CALS Data Repositories," NISTIR 4902, U.S. Department of Commerce, Gaithersburg, MD, Sep. 1992, pp. 1–59.

Varadharajan et al., "An Analysis of the Proxy Problem in Distributed Systems", Security and Privacy, 1991, IEEE Symposium, 1991, pp. 255–275.

Varadharajan et al., "An Access Control Model and Its Use in Representing Mental Health Application Access Policy", Feb. 1996, v8, n1, pp. 81–95.

Georgakopoulos et al., "Using Tickets to Enforce the Serializability of Multidatabase Transactions", IEEE Transactions on Knowledge and Data Engineering, Feb. 1994, v6, n1, pp. 166–180.

Varadharjan et al, "Extending the Schematic Protection Model–I Conditional Tickets and Authentication", Security and Privacy, 1994 IEEE Symposium, 1994, pp. 213–226.

Fang et al., "The Design, Implementation, and Evaluation of an Object–Based Sharing Mechanism for Federated Database Systems", Data Engineering, 1993 $9^{th}$ International Conference, 1993, pp. 467–475.

* cited by examiner

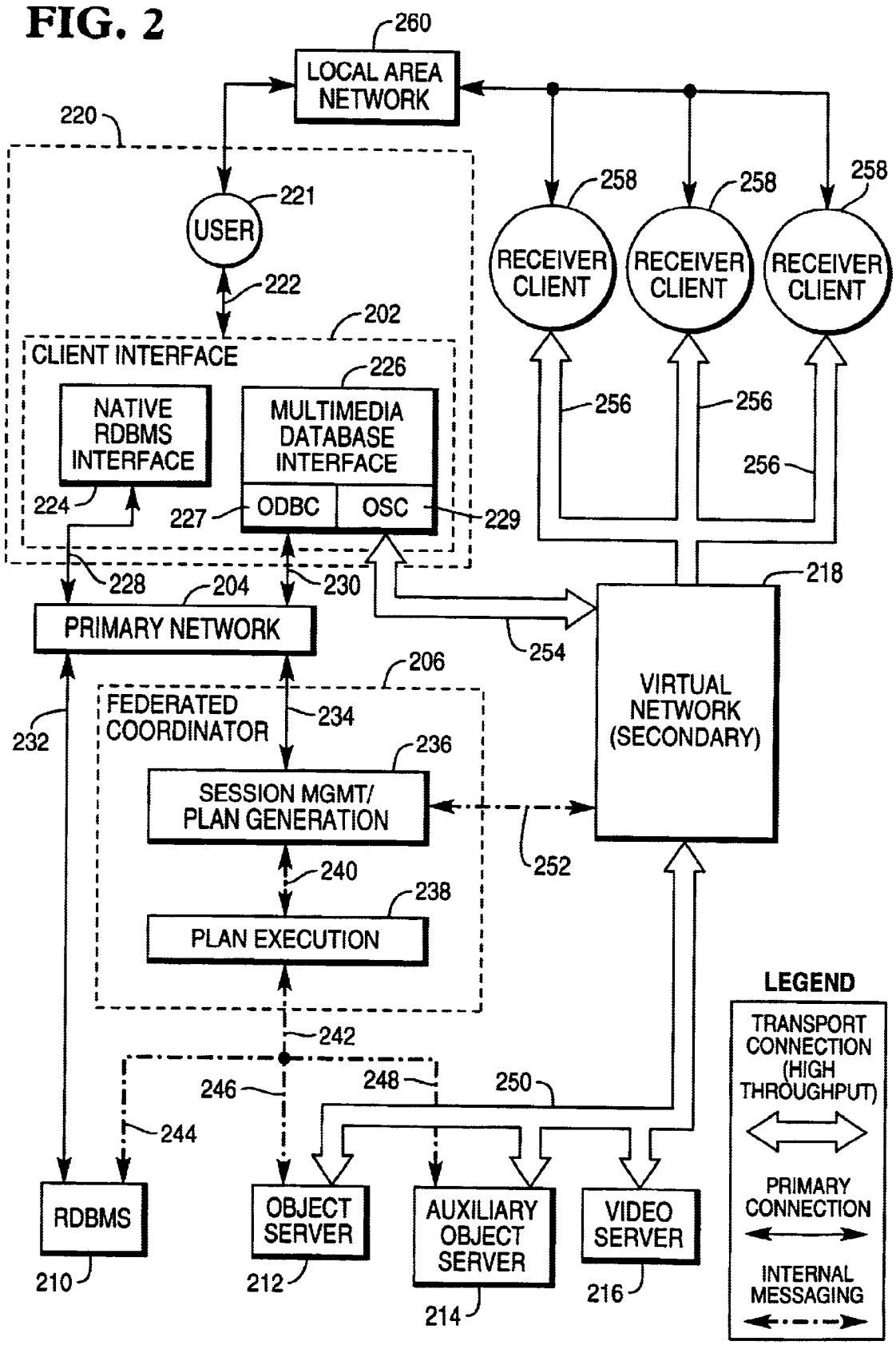

METHOD AND APPARATUS FOR PROVIDING SHARED DATA TO A REQUESTING CLIENT

This is a continuation of and commonly assigned patent application Ser. No. 08/546,466, filed Oct. 20, 1995, entitled "METHOD AND APPARATUS FOR PROVIDING SHARED DATA TO A REQUESTING CLIENT" by Felipe Carino, Jr., et al, now U.S. Pat. No. 5,930,786.

CROSS-REFERENCE TO RELATED APPLICATIONS

The foregoing application is related to the commonly assigned applications now pending before the United States Patent and Trademark Office, all of which are incorporated by reference herein:

Method and Apparatus for Extending Existing Database Management System for New Data Types, Ser. No. 08/844,476, now issued as U.S. Pat. No. 5,794,250, which is a continuation of U.S. application Ser. No. 08/546,101, by Felipe Carino Jr. et al., filed on Oct. 20, 1995, now abandoned;

Method and Apparatus for Managing Shared Data, Ser. No. 08/943,837, which is a continuation of U.S. application Ser. No. 08/546,283, by William P. Jones et al., filed on Oct. 20, 1995, now issued as U.S. Pat. No. 5,689,698;

Method and Apparatus for Parallel Execution of User-Defined Functions in an Object-Relational Database Management System, Ser. No. 08/546,465, by Felipe Carino, Jr., filed Oct. 20, 1995, now issued as U.S. Pat. No. 5,754,841;

Method and Apparatus for Providing Access to Shared Data to Non-Requesting Clients, Ser. No. 08/546,070, now U.S. Pat. No. 6,085,223, by Felipe Cariño Jr. et al., filed Oct. 20, 1995; and Method and Apparatus for Extending a Database Management System to Operate With Diverse Object Servers, Ser. No. 08/546,059, now U.S. Pat. No. 5,864,843, by Felipe Cariño Jr. et al., filed Oct. 20, 1995.

BACKGROUND OF THE INVENTION

1. Field of Invention

The present invention relates generally to database management systems, and in particular to a federated database management system that provides users and application developers with large object processing and retrieval capabilities within an SQL-based operating environment.

2. Description of Related Art

Large-scale integrated database management systems provide an efficient, consistent, and secure means for storing and retrieving vast amounts of data. This ability to manage massive amounts of information has become a virtual necessity in business today.

At the same time, wider varieties of data are available for storage and retrieval. In particular, multimedia applications are being introduced and deployed for a wide range of business and entertainment purposes, including multimedia storage, retrieval, and content analysis. Properly managed, multimedia information technology can be used to solve a wide variety of business problems.

For example, multimedia storage and retrieval capability could be used to store check signature images in a banking system. These images may then be retrieved to verify signatures. In addition, the authenticity of the signatures could be confirmed using content-based analysis of the data to confirm that the customer's signature is genuine. However, practical limitations have stymied development of large multimedia database management systems.

Multimedia database information can be managed by ordinary relational database management systems (RDBMS), or by object-oriented database management systems (OODBMS). Each of these options present problems that have thus far stymied development.

Object-oriented database management systems are unpopular because they require a large initial capital investment and are incompatible with existing RDBMSs. Further, maintaining two separate data repositories in a RDBMS and a OODBMS is inconsistent with the database management philosophy of maintaining a secure consistent central repository for all data.

RDBMSs such as the TERADATA® system are vastly more popular than OODBMS. However, existing RDBMSs cannot effectively handle large multimedia objects. Also, although RDBMS database features and functions apply equally well to alphanumeric or multimedia data types, multimedia objects introduce new semantics problems, and require new strategies for manipulating and moving extremely large objects, which would otherwise overwhelm RDBMS computational capacity and the I/O capability of the computer implementing the RDBMS.

Another problem associated with storage and retrieval of multimedia objects relates to the transmission of data from the database management system to the client requesting the data. Real-time transmission requires expensive high-throughput communications channels. For example, for real time transmission of a 100 minute audio compact disc, a data transfer rate of at 2 Kbits/sec would be required, even if the data were compressed. A 100 minute VHS movie would require 1.5 Mbits/second. High Definition Television (HDTV) would increase this requirement to 30 Mbits/sec. Also, large data instances may cause unacceptably lengthy response times to user commands, and excessive transmission costs. Also, the object data may be highly sensitive, and best transmitted over expensive high-security communication channels.

Accordingly, there is a need to extend existing RDBMSs to efficiently manipulate and move extremely large objects, especially multimedia objects. Also, there is a need to provide for secure, economical efficient selection and transmission of large object data instances to requesting clients. The present invention satisfies this need by using an intermediate database query response comprising a data surrogate associated with large object data instances. The present invention allows the user to examine intermediate database query results using this "lightweight" data surrogate before requesting object instance data transmission. The invention also provides transmission of objects over a secondary channel which may be optionally selected to optimize transmission of large object values or maintain the security of the transmitted data.

SUMMARY OF THE INVENTION

To overcome the limitations in the prior art described above, and to overcome other limitations that will become apparent upon reading and understanding the present specification, the present invention discloses a method and apparatus for providing object data stored in a database management system to a requesting client. The method comprises the steps of receiving a database query from the client on a first communication path, transforming the is database query into database management system commands, transmitting the database management system commands to the database management system, receiving a response from the database management system, the response comprising an object locator identifying data responsive to the database query, compiling an answer set comprising the database management system response, transmitting the answer set to the client on the first communications path, receiving a data request from the client comprising the media object locator, establishing a transport session with the client on a second communication path, and transmitting data identified by the media object locator to the client on the second communication path.

BRIEF DESCRIPTION OF THE DRAWINGS

Referring now to the drawings in which like reference numbers represent corresponding parts throughout:

FIG. 2 is a block diagram showing the architectural elements of one embodiment of the present invention;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is understood that other embodiments may be utilized and structural changes may be made without departing from the scope of the present invention.

1. System Concept/Components

Figure 1:
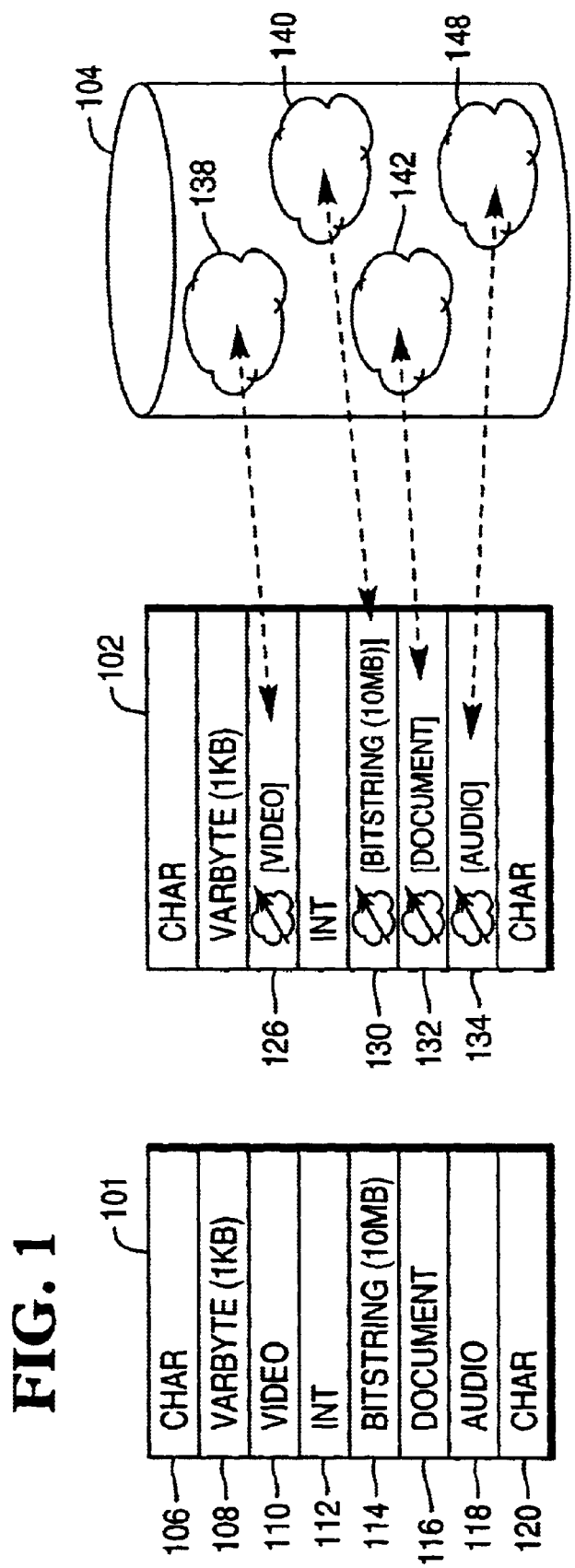
FIG. 1 is a conceptual illustration of the object-relational database structure of the present invention.

FIG. 1 presents a conceptual illustration of the object-relational database structure of the present invention, showing a representation of a generic multimedia table instantiation 101, and an object-relational database table instantiation 102. Either database structure may be stored in the memory of one or more computers or processors, or in a related data storage device. Conceptually, database instances may include both alphanumeric data and large object instances. In the generic multimedia table instantiation 101, data instances may include a variety of data types, including a character string 106, a byte string 108, video data 110, integer data 112, a large bit string 114, a document 116, audio data 118, and another character string 120. Of course, these items could all be stored in the database directly as shown, however, this makes database processing difficult, because the large data objects such as the video 110, the large bit string 114, the document 116, and the audio 118 must be must be processed along with other table elements, overwhelming the database processing capability.

These problems are avoided by using an object-relational database table instantiation 102. In the object-relational structure, each object in the row is instantiated with a portion in an object-relational table instantiation 102, and a portion in an object storage device 104. Two data types are therefore associated with large object instances, the object surrogate or identifier (such as the video object identifier 126, the large bit string object identifier 130, the document object identifier 132, and the audio object identifier 134) type and an object value type (the video object 138, large bit string object 140, document object 142, and audio object 144, respectively). This allows a "lightweight" surrogate to "represent" data where the objects are too large to be casually copied or moved from one place to another.

FIG. 2 is a diagram showing one implementation of the object relational database structure described above. The primary components of the present invention are a client 220, a receiver client 258, a relational database management system (RDBMS) 210, an object server 212, a primary network 204, a federated coordinator 206, and a virtual network 218.

The client 220 is where user 221 requests are submitted and where results are normally displayed. Architecturally, the client 220 may be an independent computer with sufficient buffering and processing to support the presentation of results to the user 221. Functionally, the client 220 hosts end-user applications programs, sends application structured query language (SQL) and general purpose call level interface (CLI) requests to the federated coordinator 206, which participates in object transport connections set up by object server 212, and receives result set elements and stages them for display, playback, or further processing by client applications.

The client interface 202 provides an interface between the client 220, the federated coordinator 206, and the virtual network 218. The client interface 202 may be resident in the same computer system as the federated coordinator 206, the client 220 or a separate computer, and comprises an open database connectivity module (ODBC) 227 and an object server connectivity module (OSC) 229. In the preferred embodiment, the ODBC module uses MICROSOFT's® Open Database Connectivity technology, which is well known in the art. The ODBC 227 provides an interface between the client 220 and the federated coordinator 206. Since the a command from a client 220 could be either a direct SQL command or a command in another language from an application resident at the client, the ODBC 227 translates object-relational database (ORDB) commands from the client 220 into a form suitable for the federated coordinator 206. In one embodiment, these ORDB commands are translated into Multimedia-SQL (M-SQL), an object relational database language compatible with and derived from SQL. Of course, the actual language implementation is unimportant, and those skilled in the art will recognize that many different languages and protocols can be selected, so long as the ORDB commands are from potentially multiple sources are interpreted and translated into commands that can be understood by the federated coordinator 206. As described herein, the OSC 229 and ODBC 227 are parallel, but not independent, because the ODBC 227 also uses the OSC 229 to redirect object instance data streams to the ODBC 227 control interface to preserve ODBC 227 application interface semantics and to hide the fact that the object data resides on a different data source (such as object server 212) from the RDBMS 210.

Receiver clients 258 are client instances that receive subsets of queries submitted by another client instance. A request from a client 220 can result in some portion of a result set being transported to a receiving agent other than the client. This feature allows multimedia objects selected from the database to be down-loaded to a special playback device, such as a video server 216. This feature also allows work-sharing between clients, in which context one client is treated as a receiver by another. Functionally, receiver clients 258 are capable of a subset of client 220 functions.

Receiver clients 258 can participate in object transport connections, and receive result set elements and stage them for display, playback, or further processing by client applications.

The RDMBS 210 in FIG. 2 is analogous to the object relational database table instantiation 102 described in FIG. 1. The RDBMS 210 is used to store, retrieve, and process alphanumeric data and the object identifiers described above. Architecturally, the RDBMS 210 logical database component can be any relational database system, such as the TERADATA® Database Version 2. In one embodiment, communications between the client 220 and the RDBMS 210 are in SQL, the American National Standards Organization (ANSI) and International Standards Organization (ISO) standard database management language. The object-relational database management system enhances this SQL to provide access to non-traditional data types as well as normal RDMBS data types using the object identifier paradigm to create an object-relational database system. The present invention enhances the RDBMS 210 by adding abstract data type functions such as those envisioned for SQL-3 and user-defined functions for content analysis of objects. However, the functions performed by the RDBMS 210 are operationally no different than those which would be expected of any database product. The extensions provided by the present invention do not change the semantics of how the relational data in the RDBMS 210 are defined, managed, or used.

The object server 212 stores and manages objects, executes user-defined functions on those objects, performs connection operations through the virtual network 218 to transport selected objects, including real time session control, and participates in distributed transactions ,as directed by the federated coordinator 206, and is analogous to the object storage 104 in FIG. 1. The extent of these object handling capabilities will depend significantly upon the type of objects and client application needs. In one embodiment, the object server 212 provides scaleable processing over very large collections of object values in a query processing context. Other object servers, such as the auxiliary object server 212 and the video server 216 are also supported, but are not required. A wide variety of object servers can be supported by the present invention. For example, the video server 216 may provide movie-on-demand applications, and the auxiliary object server 214 may provide special search engines for text-processing applications. Initially, the video server 216 may be limited to storage and retrieval of objects, but may later be expanded to allow content based operations on the data stored therein. Another possible auxiliary object server would be a dedicated text processor for independently storing a text index and performing text searches against the index. In this configuration, the object server 212 could store the actual text documents as data objects.

The federated coordinator 206 comprises a session management/plan generation module 236 which handles all aspects of primary sessions between clients 220 and the host. The session plan/generation module 236 also accepts requests from clients 220, and transforms them into execution plans which are executed by the RDBMS 210 and the object servers 212, 214, and 216, performs database administration, establishes sessions with the client 220 (including maintaining accounting information and termination), and interprets client SQL or CLI requests and transforms them into execution plans.

The plan execution module 238 manages repositories of large object values, including multimedia data. The plan execution module 238 is the host agent responsible for executing plans built by the federated coordinator 206, and interacts directly with the RDBMS 210 and the object server 212 instances. Relational data and data dictionary tables are stored by the RDBMS 210, while object values are stored on the object servers 212, 214, 216. The plan execution module processes the execution plans generated by the session management/plan generation module 236, participates in distributed transactions, stores result sets and participates in sending the result sets to clients 220, manages object servers 212, and participates in setting up transport connections controlling execution of user defined functions in the object servers 212.

In the present invention, the RDBMS 210 is used as a resource that may be shared with other applications. As such, the RDBMS 210 may contain database and table instance which have nothing whatever to do with the object-relational database or any of its functions or operations. Accordingly, it is desirable for native database operations and interfaces to be supported concurrently with the object-relational database management system. The present invention provides this capability by providing a separate native interface to the RDBMS 210, and by automatically applying associated database access control mechanisms to keep non-object-relational database applications from modifying physical structures which contain object data values or their locators. This native connectivity is also illustrated in FIG. 2. The RDBMS 210 can interface directly with the client 220 via the native RDBMS interface 244 or via the multimedia database system of the present invention. Database commands are supplied to native RDBMS interface 224, and passed to the RDBMS 210 via the primary network 204. Database responses from the RDBMS 210 are supplied to the client along the same data path.

Communications between the components of the present invention include (1) primary communications, (2) transport communications, and (3) internal messaging communications. Communications between the components of the present invention include as primary communications, transport (or secondary) communications, and internal messaging communications. Communications between the user 221 and the object-relational database management system are provided via the client interface 202, and these communications will generally be internal to a computer implementing the client interface 202. Communications between the client interface 202 and the federated coordinator 206 are provided via a primary network 204 by a first or primary communication path 234, which provides an electronic or optical pathway for communication signals. Since it is not necessary for large object data instances to be transported via this communication path, the primary communication path 234 need not be a high bandwidth communications link.

Internal messaging communications are provided through internal messaging data paths between the federated coordinator 206, the virtual network 208, and the RDBMS 210, object server 212, and auxiliary object server 214. Since large object data instances are not transmitted via these paths, they also need not offer high bandwidth communications.

The client 220 also communicates with the object server 212, and optionally, an auxiliary object server 214 and/or a video server 216 by establishing transport connections 254, 256, 250 using the virtual network 218. Optionally, these communications are established according to selected performance criteria indicated by a quality of service (QOS) parameter selected by the client 220. Normally, these communications are established only for the period of time required to transmit object data to the selected destination.

These transport communications could be established by Asynchronous Transfer Mode (ATM) or Fiber Distributed Data Interface (FDDI), Switched Multi-megabit Data Services (SMDS) or other high bandwidth network. ATM is a high-speed switching network technology for local area networks (LANs) and wide area networks (WANs) that handle data and real time voice and video. It combines the high-efficiency of packet switching used in data networks, with the guaranteed bandwidth of the circuit switching used in voice network and provides "bandwidth on demand" by charging customers for the amount of data they send rather than fixed-cost digital lines that often go under-utilized. SMDS is a high speed switched data communications service offered by local telephone companies to interconnect LANs. It uses IEEE 802.6 DQDB MAN network technology at rates up to 45 megabits per second (Mbps). Of course, the present invention is not limited to the particular embodiments of the virtual network described herein. Any network that provides enough bandwidth and nominal latency can be used to practice the present invention.

2. Federated Coordinator

Figure 3A:
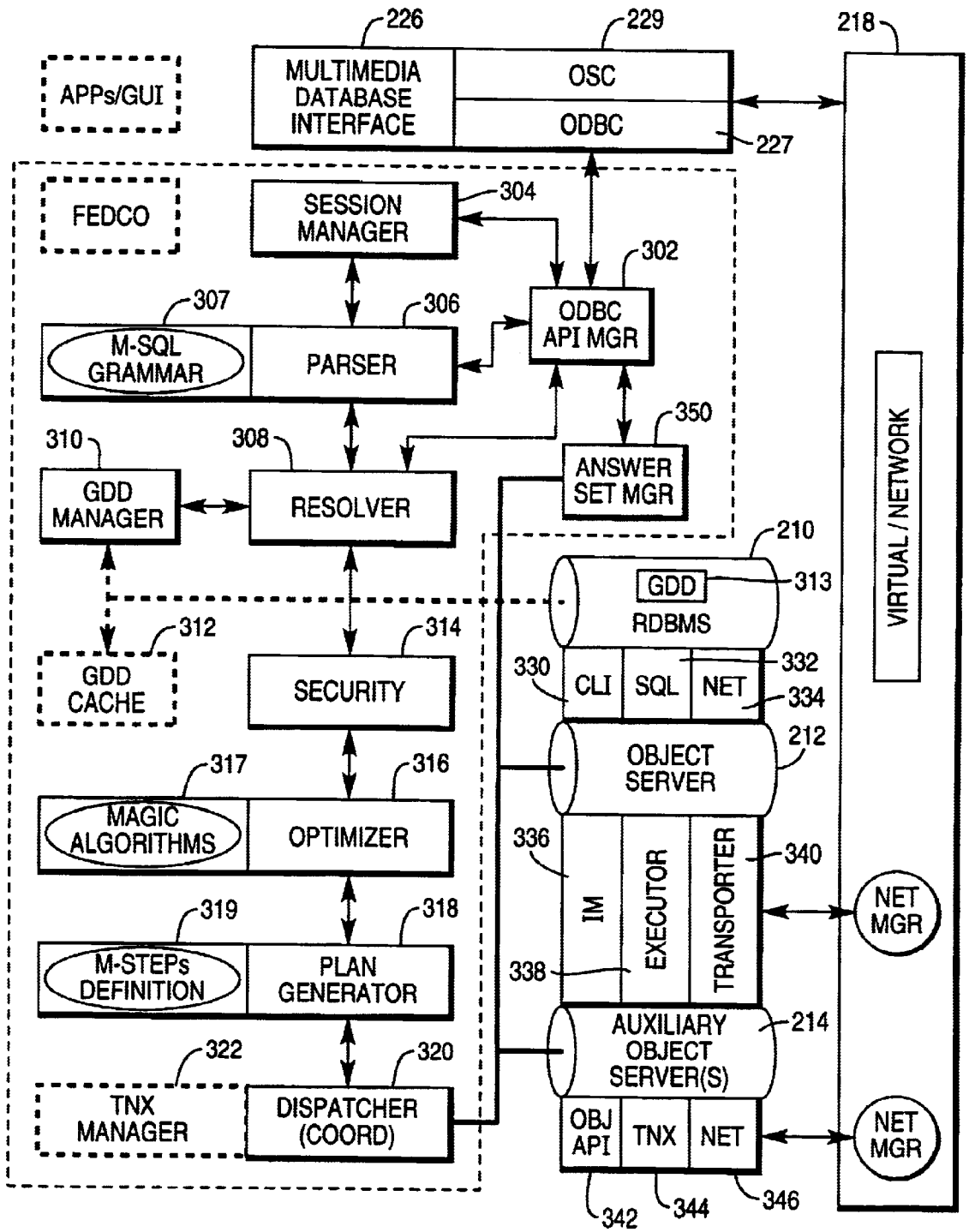
FIG. 3a is a block diagram showing the component modules of the federated coordinator of the present invention.

A diagram showing the component modules of the federated coordinator 206 and their interrelationships is presented in FIG. 3a. The federated coordinator 206 comprises an ODBC Application Program Interface (API) manager 302 such as the MICROSOFT® ODBC API coupled to a session manager 304, a parser 306, a resolver 308, and an answer set manager 350. The ODBC API manager 302 coordinates activities between the session manager 304, the parser 306, the resolver 308, and the answer set manager 350.

The ODBC API manager 302 handles ODBC requests to establish a session, parse a query, and resolve a query plan. The ODBC API manager 302 also handles first-pass answer set data that is obtained from the answer set manager 350 and sent to the requesting client 220.

The session manager 304 creates a session that is used to communicate with the client 220, and assigns a session identifier. This session handles incoming requests and sends back responses to the client 20. However, the session manager does not participate in object data transport activities.

The parser 306 checks the syntax of the commands from the ODBC 227 and uses a grammar definition 307 (M-SQL, for example) to generate a high-level collection of object structures that will be later optimized and converted into a query execution plan. This is accomplished by defining language protocol classes (objects) that represent the parse tree. In one embodiment, these objects are defined according to the C++ protocol. For example, suppose the client 220 wanted to retrieve data comprising a magnetic resonance image (MRI) for patients who are older than 45 years of age and who have a tumor greater than 0.13 centimeters in diameter. Further suppose that the information is stored in a "patient" DBMS table such as the object relational database table instantiation 102 shown in FIG. 1, which includes object identifiers to MRI data in object storage. An SQL command responsive to this client request is as follows:

SELECT patient_name, MRI FROM patient WHERE age>45 and TumorSize(MRI)>0.13

The parser 306 creates a link-list of attribute objects (such as "(patient_name, MRI)"), table name objects (such as "(patient)"), and predicate expressions. In the example above, there are two predicate expressions, (age>45) AND (TumorSize(MRI)>0.13). The first boolean predicate expression contains an attribute (age) and a scalar expression (>45). The second boolean predicate invokes a user defined function (UDF) which will operate on the object data. UDFs are described in detail later in this specification. The above example would result in a C++ pseudo-code generation such as described below:

ProjectList=ObjName (Patient_name), UDFType(MRI);
FromList=TblName (Patient)
Boolean1=BoolExprEval (age, BOOL_GT, 45);
Boolean2=BoolFuncEval (UDFExec(TumorSize(MRI)), GT, 0.13);
WhereClause=BoolAND (Boolean1, Boolean2);
ExecPlan=new SqlSelect (ProjectList, FromList, WhereClause);

The resolver 308 receives the object structures from the parser, iterates over the object parse tree, and binds attributes and UDF invocations to object-relational tables and libraries. The resolver 308 also appends statistical, static cost, and historical usage information to the parse tree objects. This information is later used to optimize the query plan. For example, in the example described above, the resolver binds "patient_name" and MRI to the "patient" table, and makes sure that the function TumorSize() is a valid function for type MRI within the "patient" table.

The resolver 308 obtains statistical, static cost, and historical usage information from the Global Data Dictionary (GDD) 313, which is stored in the form of GDD tables in the RDBMS 210, and managed by the GDD manager 310. The GDD manager 310 also maintains a user-configurable and definable GDD cache 312 which is updated when changes are made to the GDD 313. This is accomplished by spoiling entries during data definition language (DDL) M-SQL operations or checking a time-stamp or version number associated with the GDD tables. If a change has occurred, the GDD manager 310 updates the GDD cache 312. The GDD cache 312 structure is subdivided into boundary areas which are allocated to a GDD table whose values are replaced using a least recently used (LRU) algorithm. This method decreases system response times and improves overall performance. The GDD manager 310 also checks the integrity of the entries in the GDD 313.

The security module 314 determines whether a user and/or application has approved access to the requested data. If the user/application is determined to have access to the requested data, the output of the resolver (an object parse tree bound with attributes and UDF invocations) is provided to the optimizer module 316.

The optimizer module 316 optimizes and balances query plans using the appended cost values from the GDD 313 and derived costs computed from the parse tree. The optimizer module 316 iterates over the parse tree while evaluating parse tree branch options to modify the object parse tree which is used by the plan generator 318 to generate optimized query plans. Of course, the number of iterations can be bounded to avoid excessive optimization time.

Many different optimization algorithms and optimization criteria are within the scope of the present invention. For example, parse object trees may be optimized with regard to any or all of the following criteria: query response time, system throughput, primary network 204 traffic and usage, temporary result and space management, parallel or concurrent execution of query steps, predicate evaluations involving one or more UDFs, and resource allocation provided to individual queries. Also, although a system in which the optimization precedes plan generation, other implementations are within the scope of the current invention. The process of optimization can be performed any time after binding, and different data structures may indicate that optimization should occur after the query plans are generated.

The plan generator 318 translates the optimized parse tree into a query execution plan. This is performed by writing functions that transform parse-tree objects into multimedia step (M-Step) commands that can be understood by the component modules which will receive these commands. For example, the RDBMS 210 M-Step can be SQL and for TERADATA® internal (AMP) steps and the object server 212 may use special object M-Steps that invoke UDF functions. The protocol for M-Step commands is stored in the M-Steps Definition 319 and accessed by the plan generator module 318. Of course, those skilled in the art will recognize the present invention could be practiced with other command protocols as well.

The dispatcher 320 distributes the M-Steps to the RDBMS 210, the object server 212, and any auxiliary servers 214. For the RDBMS, these steps are interpreted according to the CLI protocol 330 and are in the SQL 332 language. For the object server 212, these steps are sent to the interface manager (IM) 336 for evaluation. For auxiliary object servers 214, the M-Steps are interpreted by the auxiliary object server application program interface (OBJ API) 342. The dispatcher 320 also coordinates execution of the M-Steps, and coordinates sending first-pass results from the M-Step commands to the requesting client 220.

The answer set manager 350 collects the partial results from the RDBMS 210 and corresponding object identifiers (such as the video object identifier 126, the large bit string object identifier 130, the document object identifier 132, and the audio object identifier 134 in FIG. 1) from the object servers 212, 214, and 216. The answer set manager also converts object identifiers to object locators (OLs). If responding to a SELECT client 220 query, this first-pass information is sent to the client 220 via the primary network 204. The non-relational objects are later retrievable using the OLs via a virtual network 218 connection. If not a SELECT query, success or failure packets are sent to the client 220 via the primary network 204. The answer set manager 350 also appends a security ticket to the object identifier. This assures that only authorized clients are granted access to the object data.

3. Virtual Network

As described above, first-pass query responses regarding large data objects from the object managers 212, 214, 216 are transmitted to the client 220 via the primary network 204. Because these communications are low bandwidth, the primary communication network 204 need not have high-throughput capability. However, large data objects, such as multimedia data, typically require high throughput capability for efficient transmission and display. Accordingly, large data objects are transmitted to clients 220 and receiver clients 258 via a second or separate communications path such as the virtual network 218, which supports high-throughput communications. This separate communication path configuration also has other advantages. Object data may be highly sensitive, and require special security measures to assure that it is not compromised or otherwise disclosed in transmission. Providing a separate path for data transmission allows the security of the object data to be maintained.

Each object server 212, 214 also includes a network relation (NET) 340, 346 respectively, which contain network and bandwidth information to assist in the retrieval and storage of large objects. As described herein, when the transfer of large objects is desired, a quality of service (QOS) parameter may be used to determine which of the available communication paths is selected to retrieve or store the object.

4. Object Server

Figure 3B:
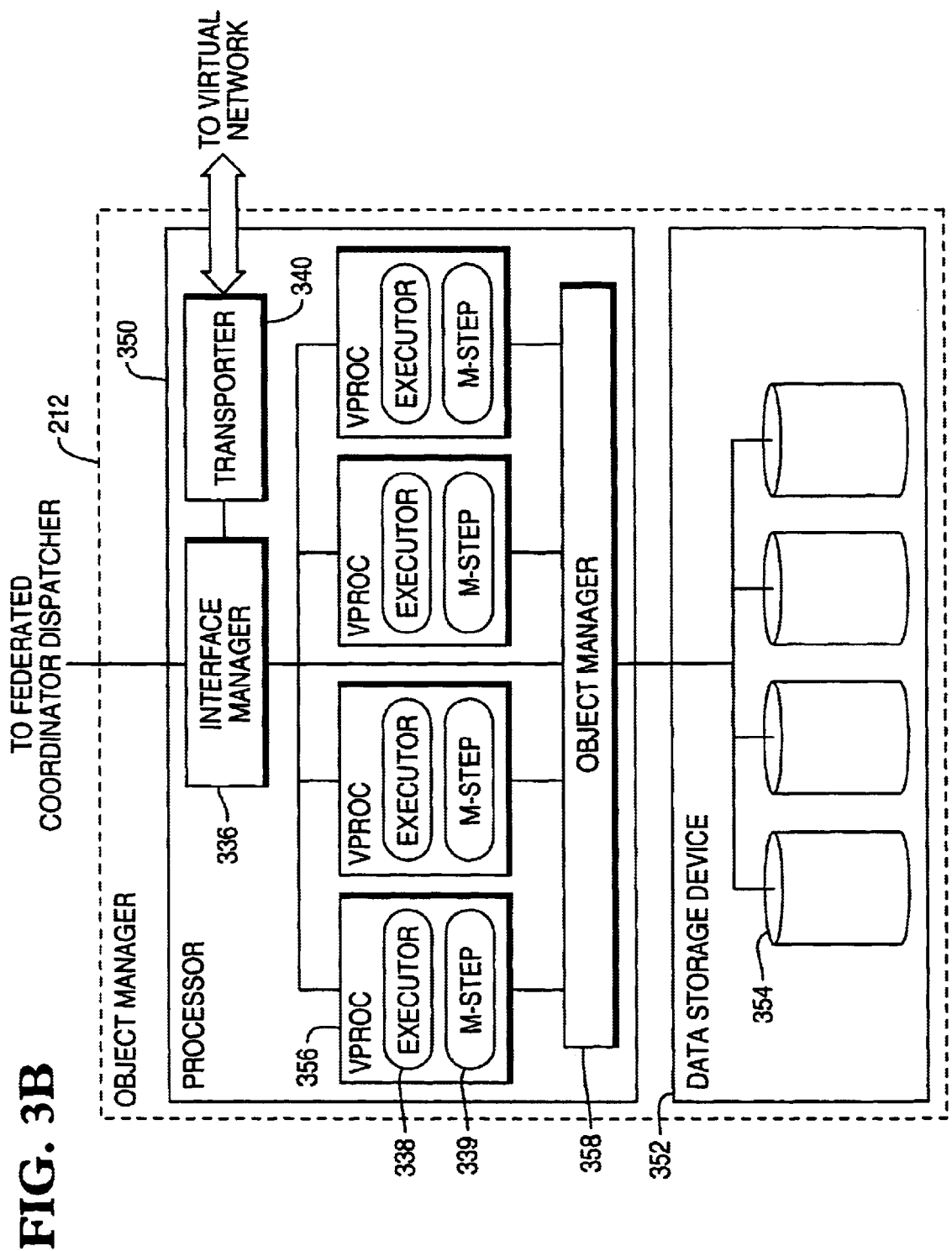
FIG. 3b is a block diagram of one embodiment of an object server.

FIG. 3b presents a block diagram of one implementation of the object server. The object server 212 comprises one or more processors 350 coupled to a data storage device 352. The data storage device 352 may comprise one or more physical disk drive units 354. The object server 212 allows applications to be implemented by virtual processors (VPROCs) 356, running on the processor 350. Each VPROC 356 is given its own private logical disk space for storing data called a virtual disk (VDISK) Which may comprise conglomeration of several physical disk drive units 354.

The use of VPROCs 356 allows parallel processing and higher system availability. For example, if a single processor were coupled to multiple disk drive units, a single thread of execution might occupy only one of the drives at a time, leaving the others under-utilized, or even idle. By using the VPROC structure, execution parallelism is increased to include one thread per disk. Multiple VPROCs with associated private VDISKs maximize CPU utilization as well. For example, M-Steps and user defined functions may be processed in parallel using multiple VPROCs 356. This is made possible because information regarding the storage location and other characteristics of object data is stored in the global data dictionary (GDD) 313, where it can be accessed by the federated coordinator 206 to parallelize execution and dispatch M-Steps to the most efficient VPROCs 356. Execution speed is also enhanced since the M-Steps are logically placed close to the object data. Further, M-Step and user defined function execution instances are executed in the same VPROC that is associated with the VDISK containing the subject object data. By moving execution instances rather than object data, the object manager minimizes expensive and time-consuming transport of object data between memory locations within the data storage device 352.

Implemented in the processor 350 are an interface manager module 336, a transporter module 340, and an executor module 338. The transporter module 336 implements transmission and receipt of object data to and from the object server 212. The interface manager module 336 provides an interface between the dispatcher 320 in the federated coordinator 206, and the object server 212. The executor 338 on the object server executes M-Steps received from the dispatcher 320 via the interface manager module 336. The executor 338 is an application that runs VPROCs 356 established in the object server. To parallelize processing within the object server 212, multiple copies of the executor 338 are run simultaneously in each of the object server's VPROCs. Each executor 338 runs a separate worker thread. The number of worker threads spawned for each virtual processor running the executor 338 is configurable. Also, where an M-Step is for multiple VPROCS on the object server 212, multiple worker threads, usually one per VPROC, can be used to simultaneously to execute an M-Step. Communications between the executors 338 and the data storage device 352 is accomplished via the object manager 358.

5. User-defined Functions

User defined-functions (UDFs) allow client applications to define functions that operate or manipulate the values of abstract data type (ADT) object data instances. Two general types of UDFs are possible in SQL SELECT queries: projection UDFs and predicate expression UDFs. Predicate UDF's return either: (1) boolean values which are used as partial search conditions, (2) an expression value used to evaluate a boolean expression, or (3) an object used by another UDF function. Projection UDFs operate, manipulate, and/or modify objects that satisfied the query predicate for viewing or other client application uses. Other UDF uses include: (1) updating or modifying existing objects, (2) feature extraction and pattern matching, (3) converting from one data type to another (i.e. converting MPEG-2 to MPEG-4), (4) partial extraction (i.e. retrieve audio track from video) and (5) many other information extraction operations that "information mine" (multimedia) complex data.

UDFs execute on the object servers 212, 214 in a run-time environment that is logically "close" to the object instance values, or object data. UDF semantics are such that when a UDF is invoked, it is associated with a particular object instance value, even when a UDF accesses more than one object instance. Even when a UDF operates on multiple objects, all but one of them are accessed remotely. Accordingly, when UDFS are associated with an object instance value, a UDF execution thread is on a processor which is guaranteed direct I/O access to the object instance value. This increases execution speed and minimizes transportation of large object instance values, even though the UDF is not guaranteed direct I/O access to other object instance values.

In one embodiment, the UDFs are developed in C or C++, and are bound into dynamic link libraries such as those that are available in the UNIX operating system UDF invocations occur as part of SQL statement execution and they access external quantities only through parameters and return values. Parameters and returns are restricted by value, with ADT instances represented by media object identifiers (MOIDs). UDFs can use object server application program interfaces (APIs) and services in conjunction with object instance values.

6. Transaction Description a. Overview

Figure 4A:
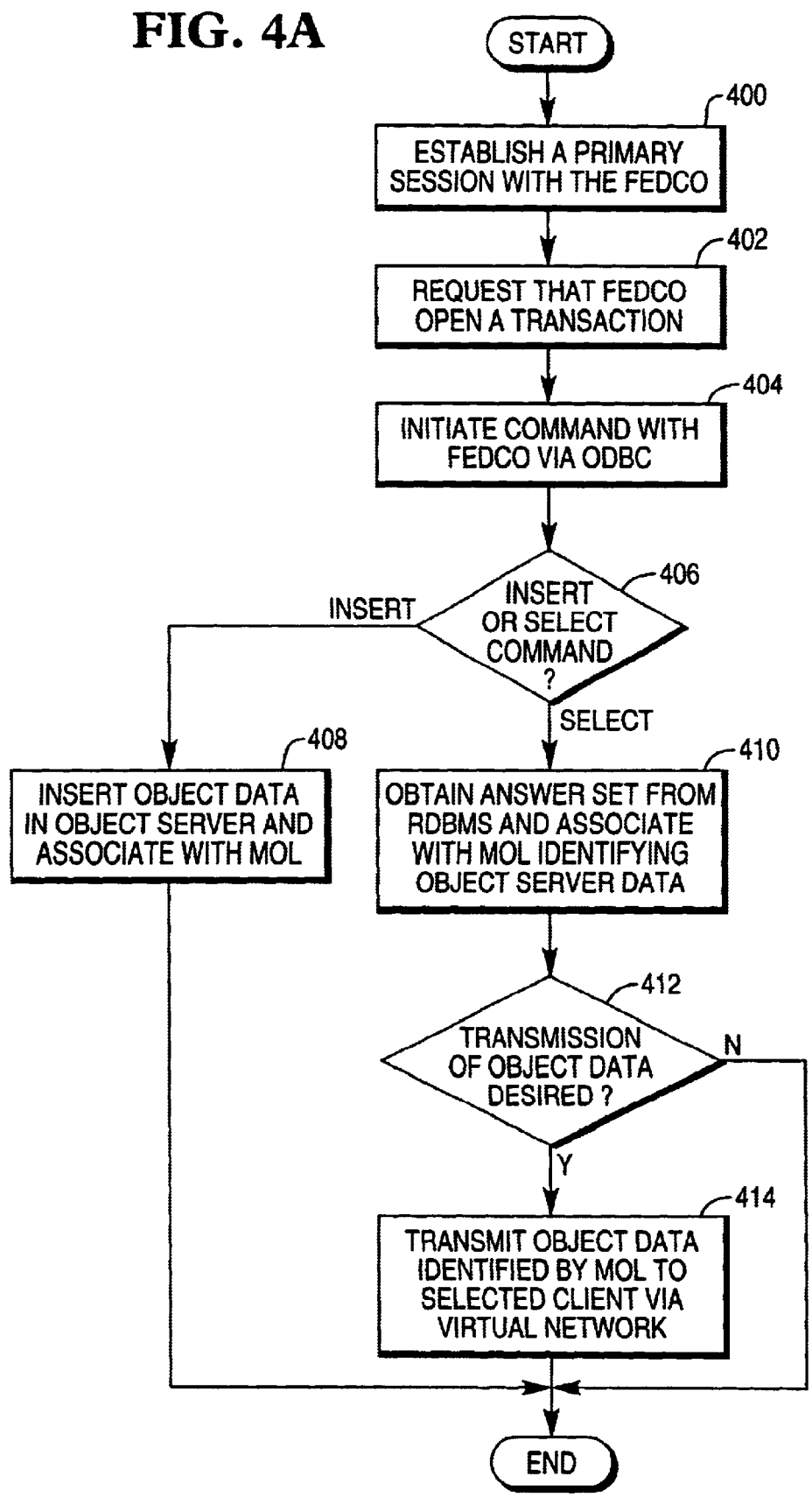
FIGS. 4a–4p are flow charts describing the operations and transaction flow for the present invention.
Figure 4B:
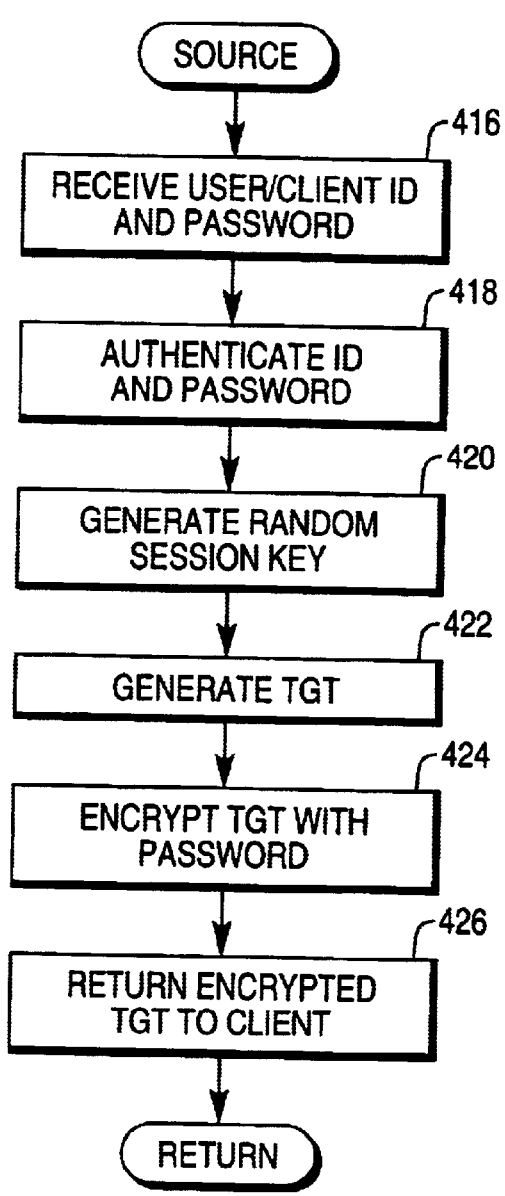
Figure 4C:
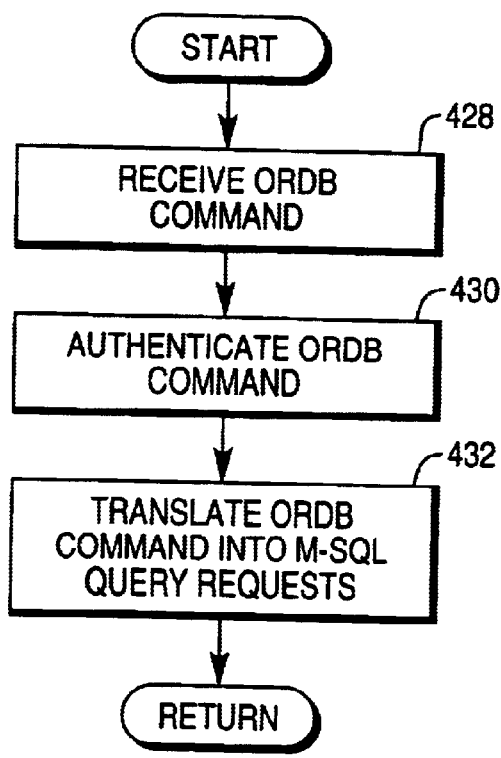
Figure 4F:
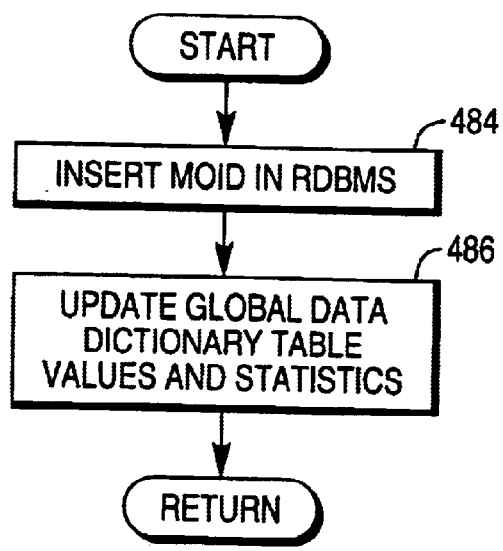
Figure 4D:
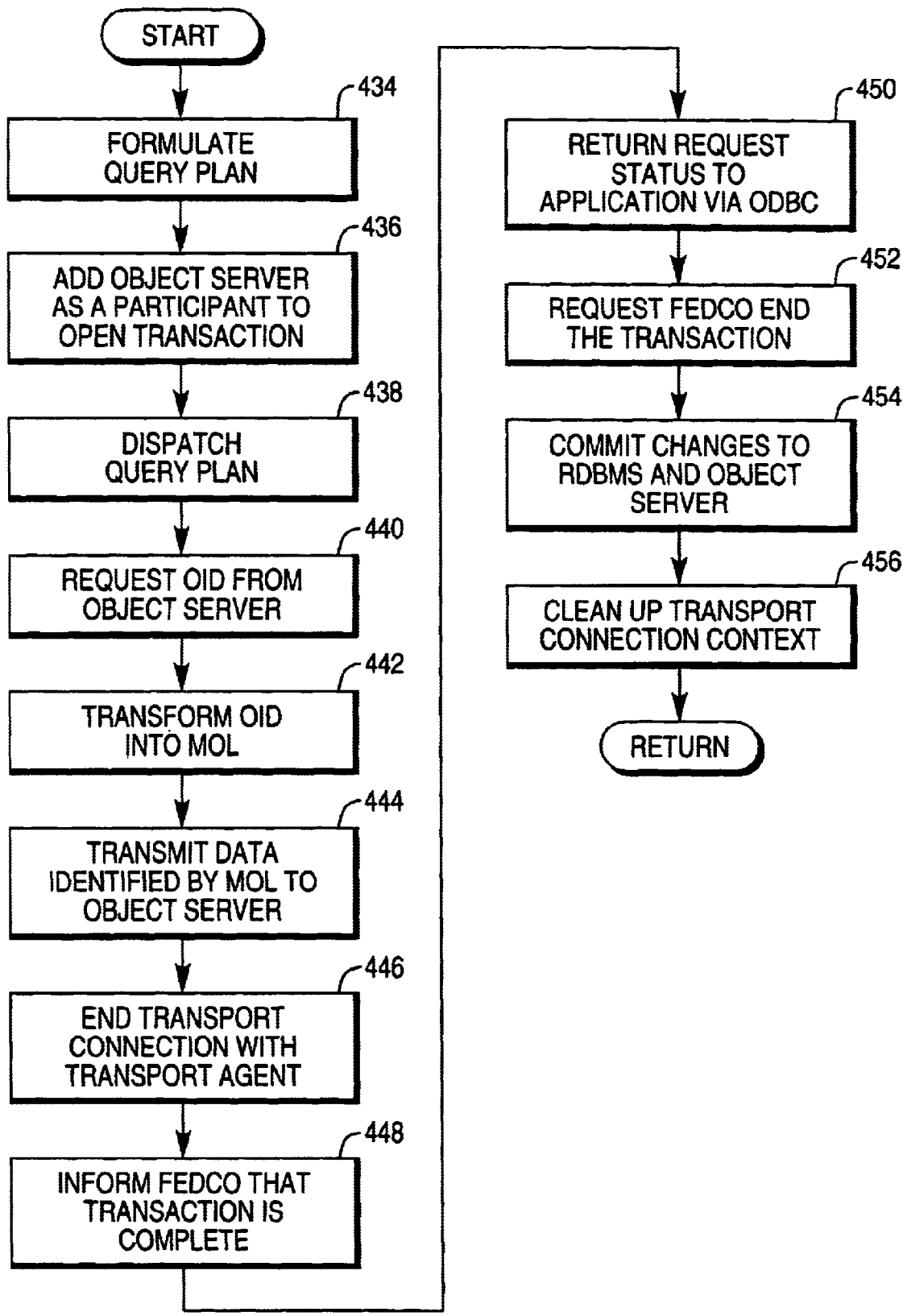
Figure 4E:
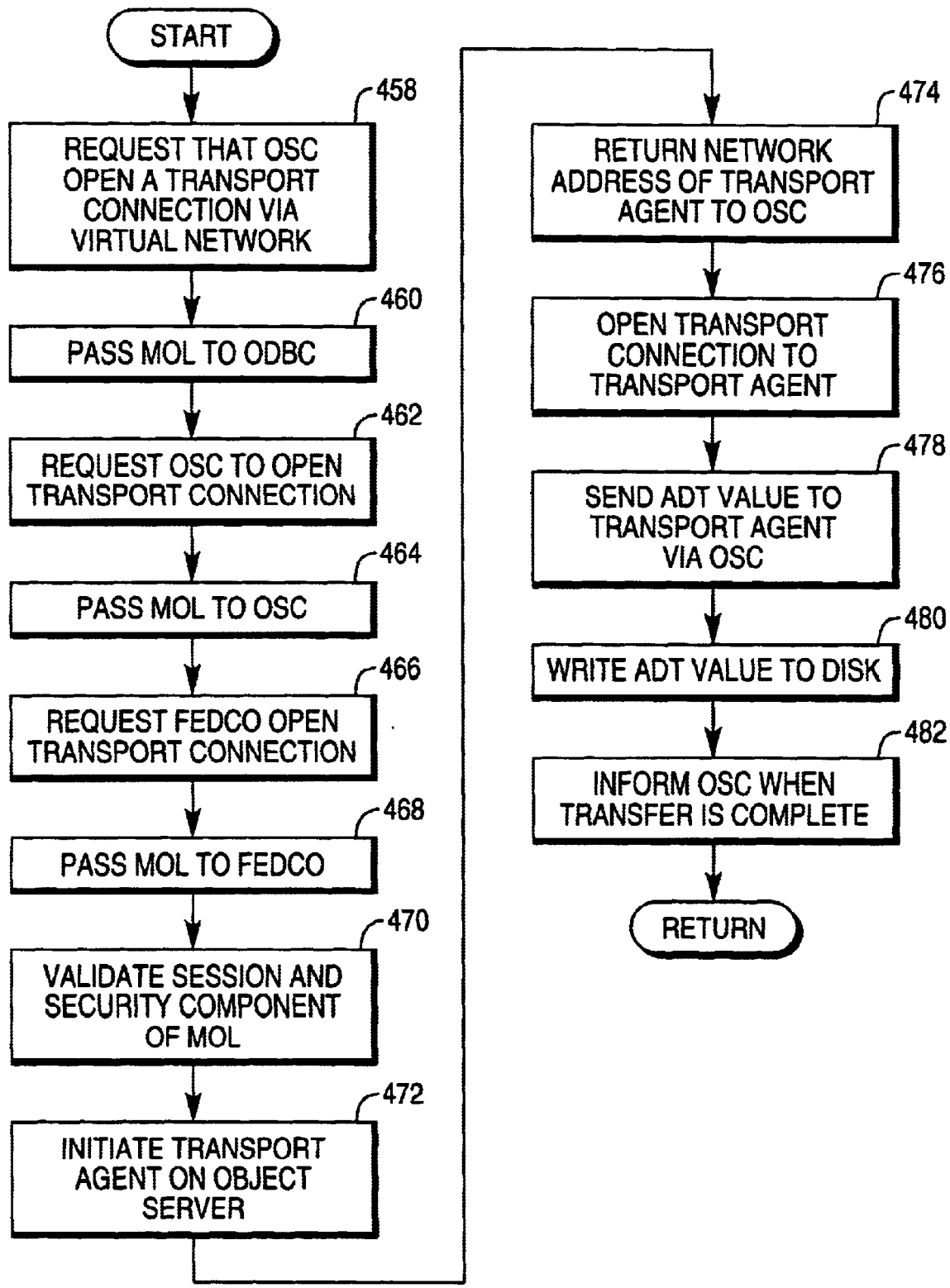
Figure 4G:
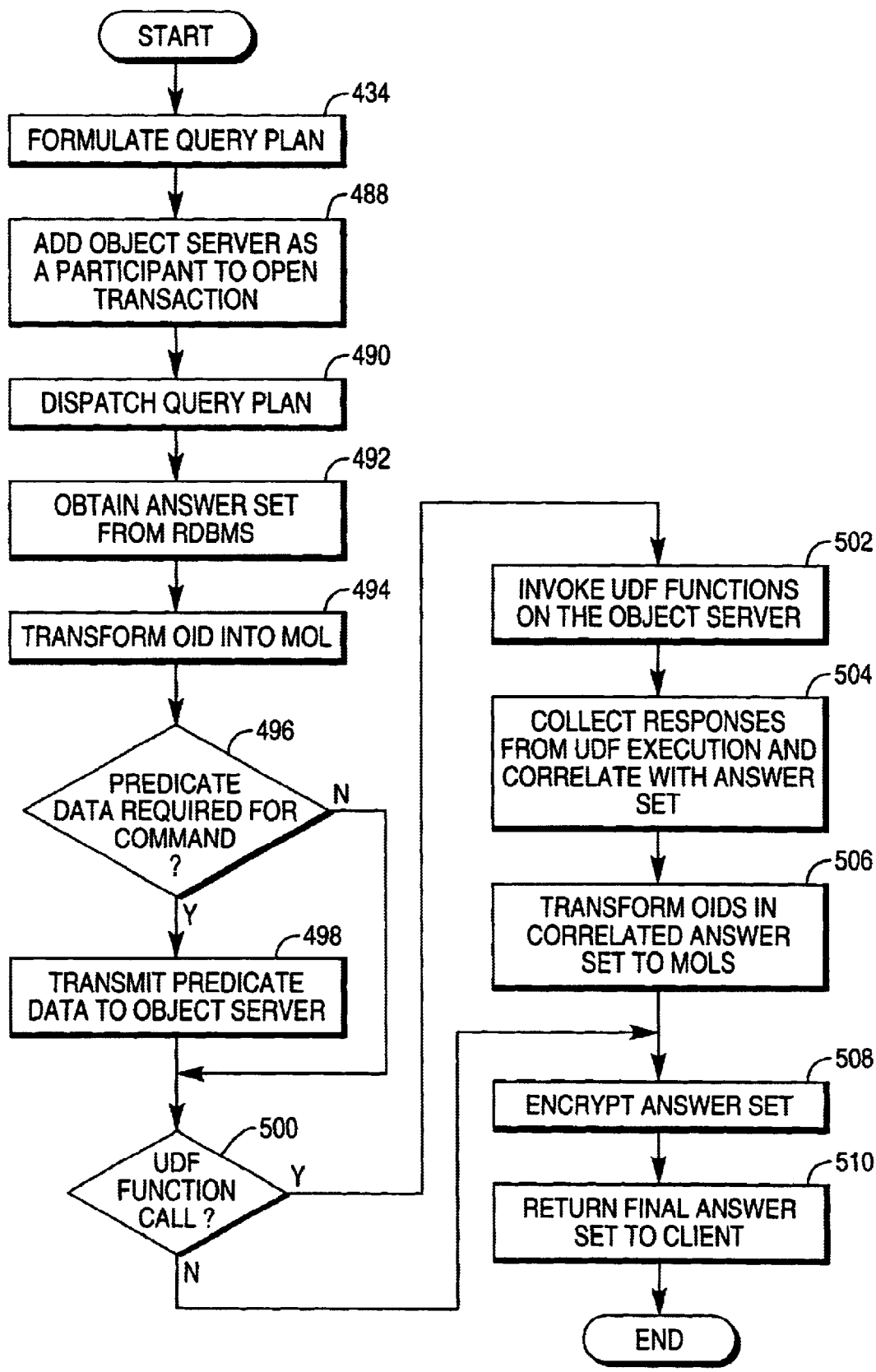
Figure 4H:
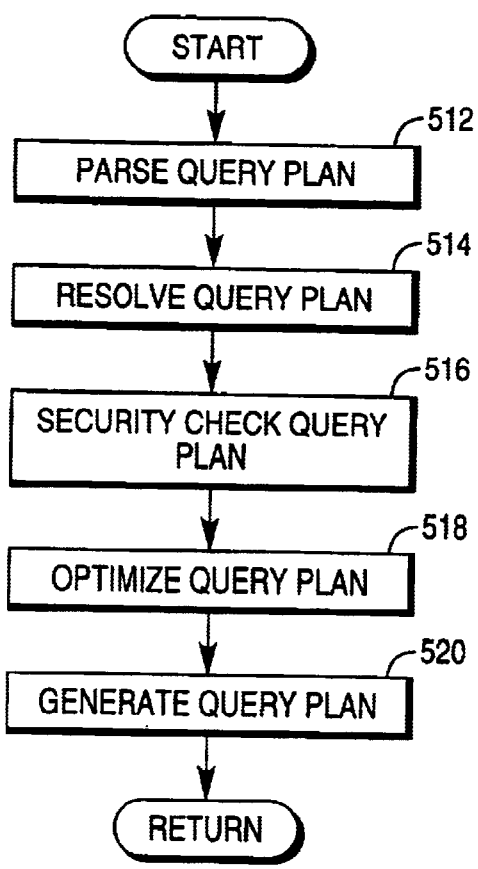
Figure 4J:
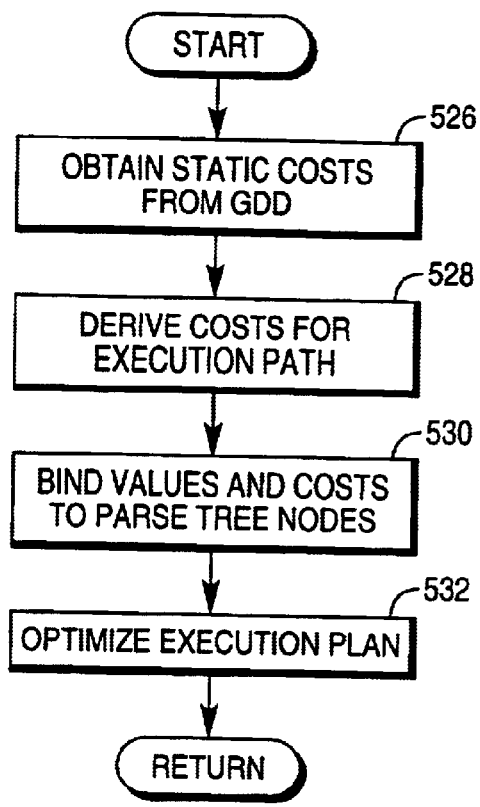
Figure 4I:
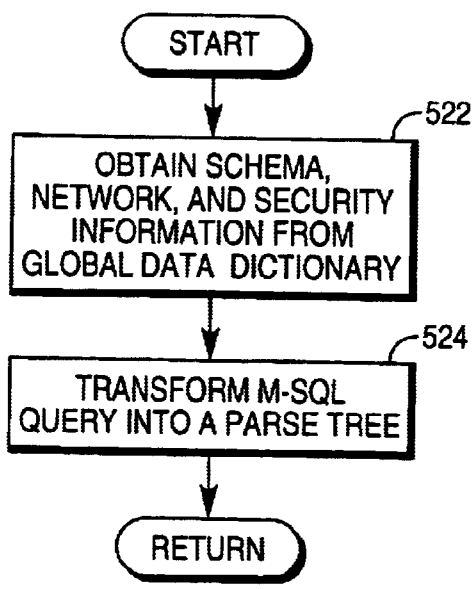
Figure 4K:
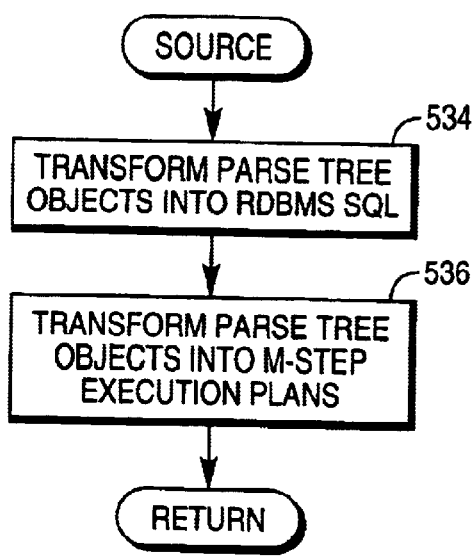
Figure 4L:
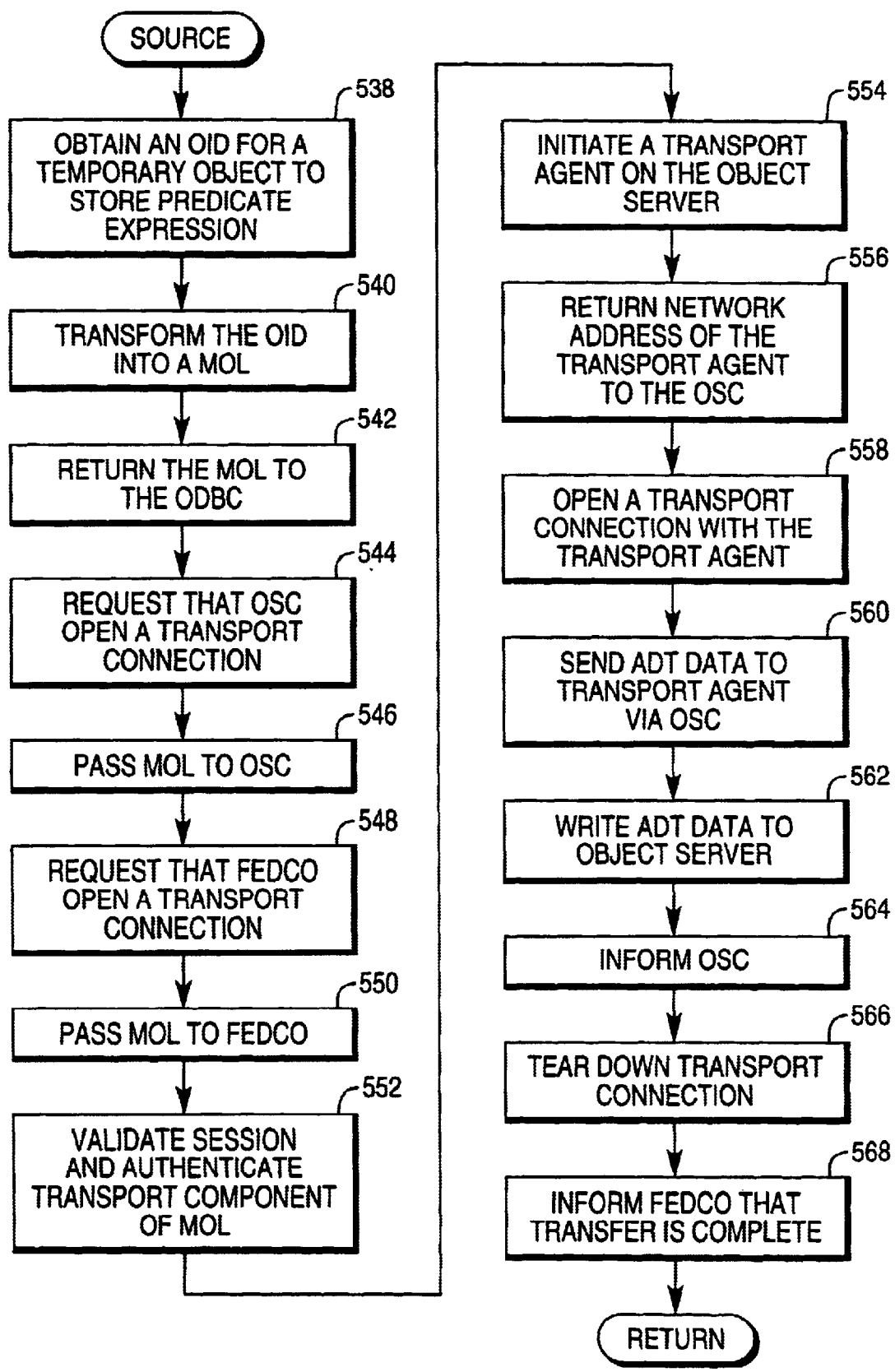
Figure 4M:
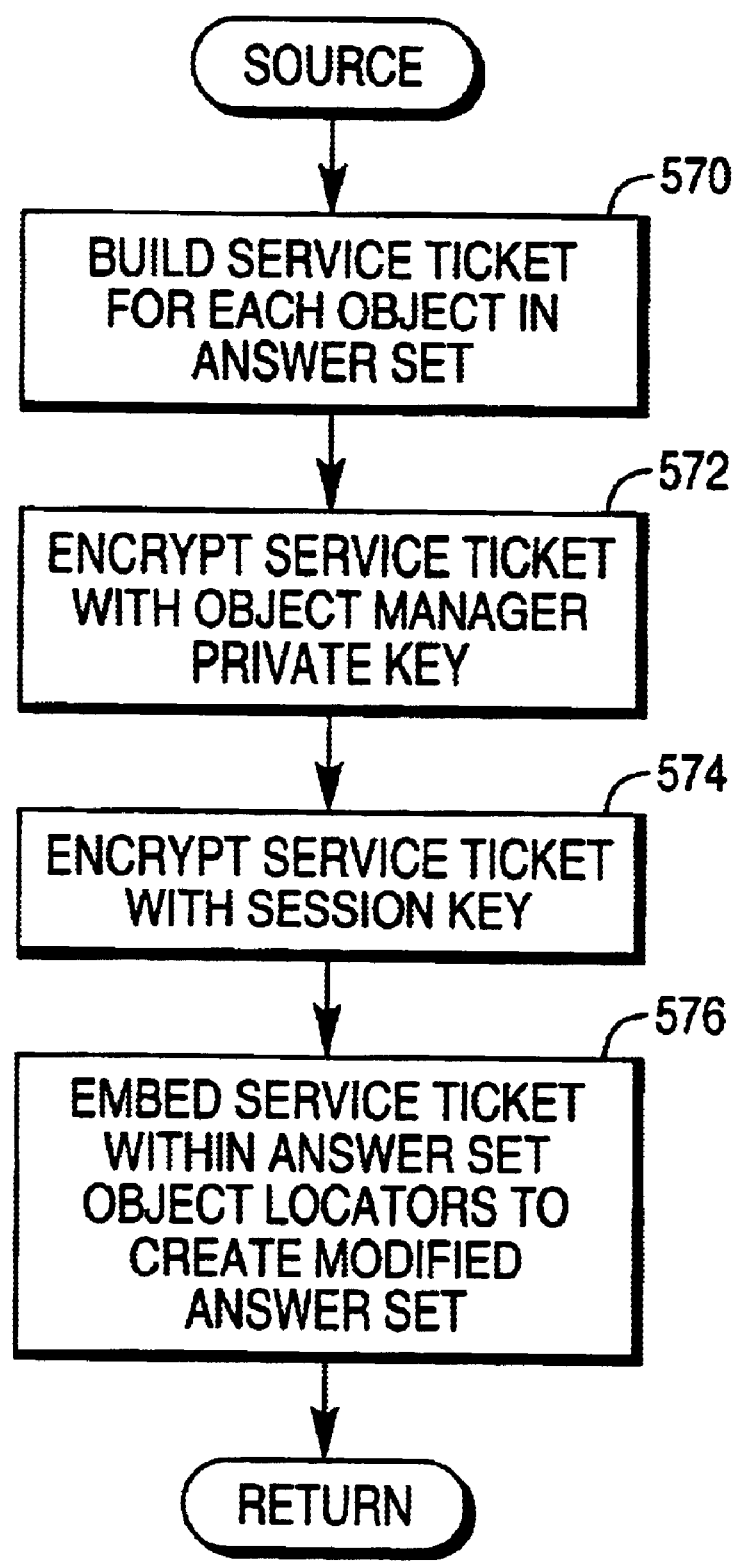
Figure 4N:
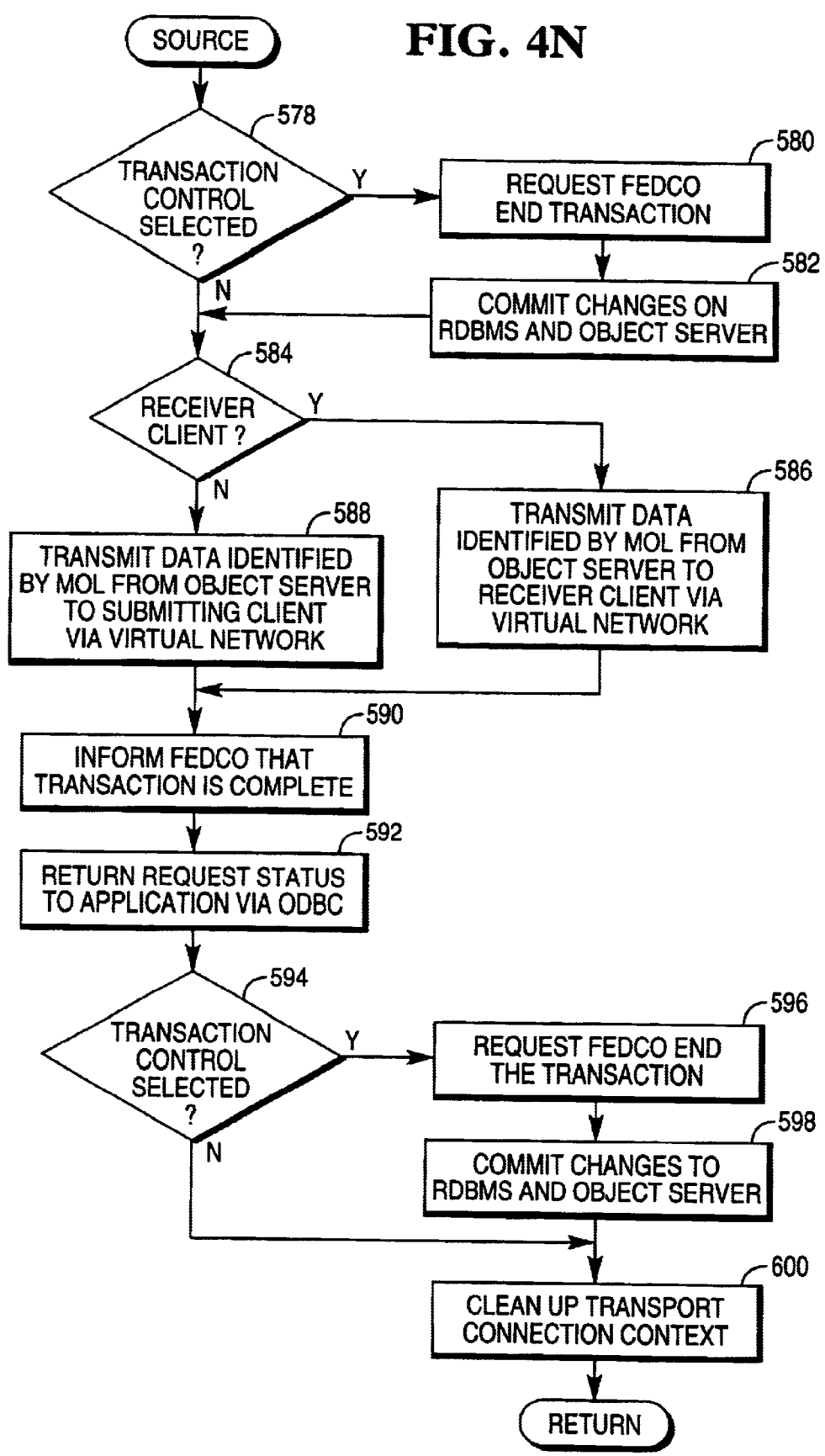
Figure 4O:
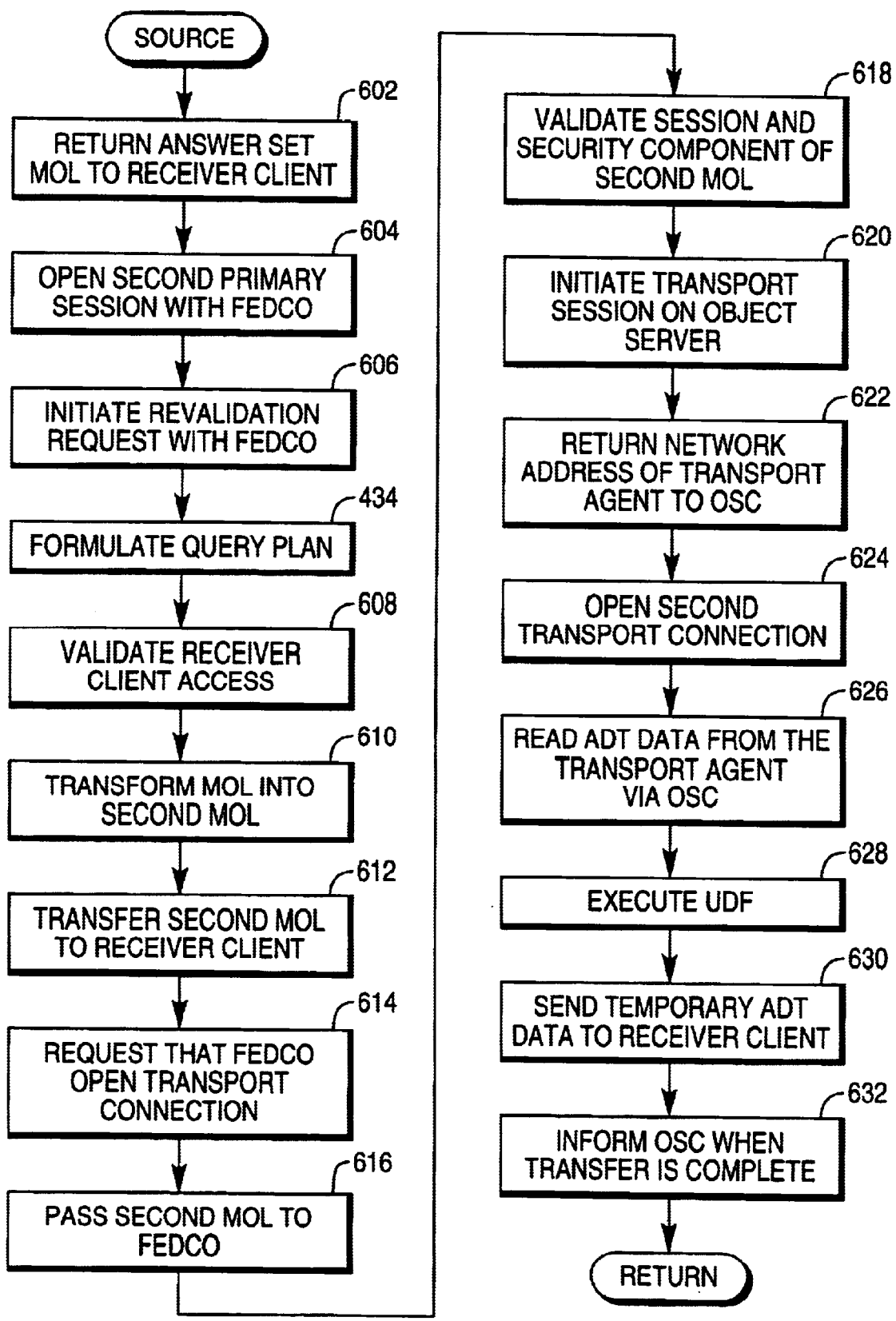
Figure 4P:
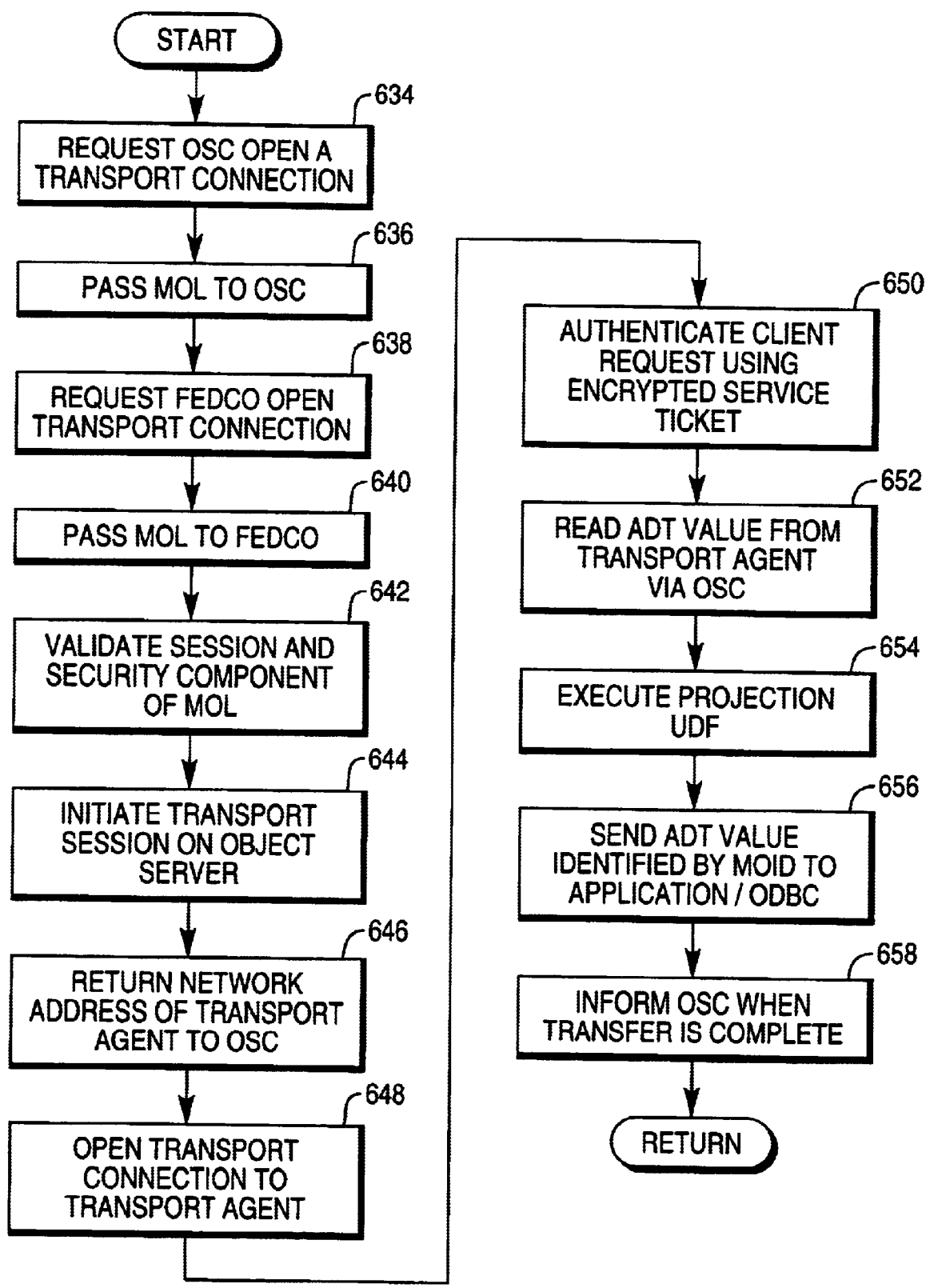

FIGS. 4a–4p present a flow chart showing of the operation of the object relational database. FIG. 4a presents a top-level description of the operation of the present invention. The process begins when the client 220 establishes 400 a primary session with the federated coordinator 206. This may be accomplished through direct commands or through an application resident at the client 220. Thereafter, the client 220 requests that the federated coordinator opens 402 a transaction, and initiates 404 the client command with the federated coordinator 206. This is accomplished using the ODBC 227. Client commands are broadly categorized into either insert commands, which store data from the client 220 to the object server 212, or select commands, which retrieve data from the RDBMS 210, and perhaps also the object server 212.

If the client command is an insert command 406, the data object selected by the client 220 is inserted 408 into the object server 212 and associated with a Media Object Locator (MOL). If the client 220 command is a select command, an answer set is obtained 410 from the RDBMS 210 and associated with a MOL to identify the subject object server data. At this time, the object data associated with the MOL may be sent to the submitting client (the client that requested the query), or a receiver client. If transmission of the object data is desired 412, the data is transmitted to the selected client via the virtual network 414.

FIG. 4b is a flow chart showing how the client 220 establishes a primary session with the federated coordinator 206. Because of the potential pay-per-view applications for an object relational database, a reliable and simple client authentication method is critical. The authentication system employed is based on the KERBEROS system. The KERBEROS system was developed by the Massachusetts Institute of Technology, and is well known in the art.

The federated coordinator 206 receives 416 a user/client identification and password, authenticates them 418, and generates a random session key 420. The federated coordinator 206 then generates a ticket granting ticket (TGT) 422. The TGT is then encrypted with the user's password 424, and returned to the client 426. When a client 220 establishes a primary session, the federated coordinator 206 generates a TGT and returns it to the client 220. Each time the client 220 originates a request on a primary session, it builds a modified authenticator value and sends it along to the federal coordinator 206 with the request. The authenticator is modified so that it does not contain the name of a specific object server, but a token server name. The authenticator includes a ticket granting ticket (TGT) which contains the name of the client 220, the name of the federated coordinator 206, the lifetime of the TGT, the network address of the client 220, and a random session key. Upon receipt of a request, the federated coordinator 206 uses the TGT embedded within the authenticator to verify that the client 220 is not a usurper. Then the federated coordinator 206 assembles a response message, it builds a service ticket for each object in the answer set, and embeds this ticket in the MOL. The ticket is encrypted with the object server's private key, then encrypted again with the client's session key. The service ticket contains the name of the object server 212, the name of the client 220, the lifetime of the ticket, the client's network address, and a token identifying a specific object. When a client 220 attempts to access an object, it must first decrypt the ticket using its session key. The service ticket, still encrypted with the object server's private key, is presented to the object server 212 which can then verify that the client is allowed to access the object without exchanging authorization or authentication messages with the federated coordinator 206. This approach, which is further described in detail below, reduces backchannel traffic messages to the federated. coordinator 206.

FIG. 4c is a flow chart illustrating how the user initiates a client command with the federated coordinator 206. The client command, which was received by the ORDB is transmitted to and received 428 by the federated coordinator. The ORDB command includes an authenticator used by the federated coordinator 206 to verify and authenticate 430 that the client is authorized to access the selected data service. ORDB commands can be direct client SQL commands, or may be commands from an application resident in the client 220. Since the federated coordinator 206 must be capable of responding to potentially different commands from several different clients, the ORDB command is translated 432 into commands readable by the federated coordinator 206, which are referred to as M-SQL commands. This process takes place in the ODBC 227.

b. Inserting Data from Client to Object Server.

If the client command was an insert command, object data from the client is inserted into the object server 212, and associated with a MOL 408. FIG. 4d describes how this is accomplished. First, a query plan is formulated 434 in the federated coordinator 206. The query plan formulation process transforms M-SQL commands into optimized RDBMS 210 and object server 212 commands. Formulation of the query plan is described in more detail later in this description. Next, transaction is opened 436 between the federated coordinator 206 and the object server 212. This transaction allows communications between different modules to proceed. After establishing the transaction, the query plan is dispatched to the object server 212 and the RDMBS 210.

The federated coordinator 206 then requests 440 an object identifier (OID) from the object server 212. The OID is then transformed 442 into a MOL, or media object locator.

After the MOL is created, the data identified by the MOL is transmitted 444 to the object server 212. This process is described in FIG. 4e. Since the ODBC 227 handles communications between the federated coordinator 206 and the client 220, and the OSC 229 handles communications between the object servers 212 and the client 220, the ODBC 227 and the OSC 229 must cooperate with one another to transmit data to the object server 212. First, the ODBC 227 requests 458 that the OSC 229 open a transport connection via the virtual network 218. The MOL identifying the data is then passed 460 to the OSC 229. The OSC 229 requests 466 that the federated coordinator 206 open a transport connection, and passes 468 the MOL to the federated coordinator 206 to accomplish this. The federated coordinator 206 validates 470 the session and security component of the MOL, using the TGT previously described. The federated coordinator 206 then initiates 472 a transport agent process on the object server 212, and returns 474 the network address of the transport agent to the OSC 229 to allow the transaction to proceed. The OSC 229 uses the network address to open 476 a transport connection to the transport agent, and the object data (ADT value) is sent 478 to the transport agent via the OSC 229. Thereafter, the object data is written 480 to a disk or other storage medium in the object server 212. Finally, the OSC 229 is informed 482 that the transfer has been completed.

Returning to FIG. 4d, the data identified by the MOL is transmitted 444 to the object server 212. Nominally, the object data transmitted is multimedia data. However, executable user defined functions can also be inserted into the object server in the same way. After the object data is transmitted 44 to-the object server 212, the transport connection with the transport agent in the object server 212 is closed 446. The federated coordinator 206 is informed 448 that the transaction is complete, and the status is returned 450 to the client 220 via the ODBC 227. Next, after the client 220 then requests that the federated coordinator 206 end the transaction 452, the changes prescribed by the insert command are committed 454 to the RDBMS 210 and the object server 212, and the transport connection context is cleaned up 456. FIG. 4f describes the process of committing changes to the RDBMS 210 and the object server 212. This process involves inserting 484 the MOID in the RDBMS 210 to create the object relational database, and updating 486 the global data dictionary (GDD) table values and statistics. The operation of the GDD will be described in greater detail below.

In the embodiment described above, communications between processes and modules utilizes a protocol in which messages are transmitted by erecting transaction processes, transmitting data, and ending the transaction process. However, the present invention could be practiced with any communication protocol, and is not limited in scope to this inter-module communication protocol described herein.

c. Retrieving Data Stored on the Object Server

If the client command was a select command, object data associated with a MOL is obtained from the object server 212, and provided to the requesting client 220 or to a receiver client 258. First, the requested data is obtained 410 using the answer set from the RDBMS 210, and if the client requests actual object data 412, that data is sent 444 to the selected client via the virtual network 218. FIG. 4g presents a flow chart illustrating the process of obtaining 410 an answer set responsive to the select command, associating the resulting data with a MOL 410. First, a query plan is formulated 434. The query plan is an optimized set of commands which will be distributed to the RDBMS 210 and the object server 212 to obtain the desired data. FIG. 4h describes how the query plan is formulated. First, the M-SQL commands are parsed 512, resolved 514, checked to assure that access to the indicated database is authorized 516, and optimized 518. Next, the optimized plan is used to generate 520 the query plan. The process of parsing the query plan is described in FIG. 4i. First, the federated coordinator 206 obtains schema, network, and security information from the global data dictionary, which is stored in the RDBMS 210. This information provides the federated coordinator 206 with the building block information it needs to parse the M-SQL commands. Next, this information is used to transform 524 the M-SQL commands into a parse tree of objects, as described earlier. Items in the parse tree are then resolved 514. This is accomplished as shown in FIG. 4j. Eventually the query plan must be optimized according to a set of criteria established by the client 220 or other entities. To perform this optimization, costs for the various alternative plans must be obtained. These costs include both static and dynamic costs. Static costs are obtained from the GDD 526. Derived costs depend on the execution path chosen, and must be calculated 528 on the go. After the derived costs are calculated 528, they are bound to the parse tree nodes 530, and by iteration, these parse tree nodes are used to derive an optimized execution plan 532. This optimized plan is then used to generate the query plan, which comprises RDBMS 210 SQL commands and M-Step execution plans for the object server 212. This process is illustrated in FIG. 4k.

In some situations, the client command requires predicate object data to be transmitted from the client 220 to the object server 212 before the UDF can be performed. If predicate data is required 496, it is transmitted 498 to the object server 212. FIG. 4l illustrates this process. First, the federated coordinator 206 obtains an OID for the temporary object 538 to store the predicate expression. The federated coordinator receives the OID, transforms 540 it into a MOL, and returns 542 it to the ODBC 227. The ODBC 227 requests 544 that the OSC 229 open a transport connection, and passes 546 the MOL to the OSC 229. The OSC then requests 548 that the federated coordinator 206 open a transport connection, and passes 550 the MOL to the federated coordinator 206. The federated coordinator 206 validates the session, verifies 552 that the transport session is authorized by examining the MOL, and initiates a transport agent 554 on the object server 212. The federated coordinator 206 returns 556 the network address of the transport agent to the OSC 229, and the OSC 229 uses this address to open a transport connection 558 with the transport agent. Thereafter, the required object data is sent 560 to the transport agent via the virtual network 218 and the OSC 229, and the object data is written 562 to the object server 212. Finally, the OSC is informed that the data transport has completed 564, the transport connection is closed 566, and the federated coordinator 206 is informed that the transfer is complete 568.

The present invention supports the operation of user defined functions (UDFs) on object data. User defined functions are executed in the object server 212, and may include a nominal function set, or may be downloaded from the client 220 to the object server 212. If the client command requires a UDF function 500, the functions are invoked on the object server 502. This process is completed when the object server 212 creates a temporary object to hold the result of the UDF function, and returns an object identification (OID) for the temporary object to the federated coordinator 206. The federated coordinator 206 collects responses from the executed UDFs and correlates 504 them with the answer set previously calculated. The OIDs of the correlated answer sets are then transformed 506 into MOLs. Thereafter, the answer set is encrypted 508 and returned 510 to the client 220.

The encryption or securing of the answer set is illustrated in FIG. 4m. As shown in FIG. 4m, a service ticket is built for each object in the answer set 570. This service ticket is then encrypted with the respective object manager's private key 572, and also with the session key 574. Finally, the service ticket is embedded 576 within the answer set object locators, thus creating a modified answer set. This allows the client 220 or receiver clients 258 to access data stored in the object server 212 without further intervention or processing from the federated coordinator 206.

If transmission of object data is desired 412, the object data is transmitted 414 to the selected client via the virtual network. The selected client could be the submitting client 220 or a receiver client 258. The present invention supports both transaction controlled transmission of object data and transmission without transaction control. As shown in FIG. 4n, when transaction control is not selected 578, the changes are committed on the RDBMS 210 and the object server 212 before the data has been transmitted to the client 220.

Data can be transmitted to the submitting client 220 or one or more receiver clients 258. Also, data may be passed via the two pass paradigm described herein using the virtual network 218, or can be sent directly to the submitting client 220, or receiver client 258 in the initial pass using the primary network 204. Ordinarily, since the selected data objects may be large, the default retrieval method would be the two pass method using the virtual network 218. However, the submitting client 220 may, with an appropriate command, select immediate transmission of the object data via the primary network 204. Further, provision is made for automatic selection of the object data transmission method from the quality of service parameter described herein. Of course, this automatic selection may be overridden by an appropriate command from the submitting client 220.

If data is to be sent to a receiver client 584, the answer set is sent to the receiver client 586. FIG. 4o presents a flow chart illustrating this process. First, the answer set MOL is provided 602 to the receiver client 258. Next, a second primary session is opened 604 with the federated coordinator 206. This request is revalidated 606, and a query plan is formulated 434. This query plan formulation process is analogous to that previously described. Next, if receiver client access is authorized 608, the MOL received at the receiver client is transformed 610 into a second MOL, and transferred 612 to the receiver client 258. This is used to request that the federated coordinator 206 open 614 a transport connection between the receiver client 258 and the object server 212. To accomplish this, the second MOL is passed 616 to the federated coordinator 206. The federated coordinator 206 validates 618 the session and security component of the second MOL, and if the receiver client is granted access to the object data identified by the MOL, initiates 620 a transport session on the object server 212. In doing so, the federated coordinator 206 receives a network address, which is later returned 622 to the OSC 229. The OSC 229 uses this address to open a second transport connection 624. Thereafter, the object data is read from the transport agent 626 via the OSC 229, and a temporary object is created by executing a UDF 628. This temporary object data is sent 630 to the receiver client 258, and the OSC 229 is informed that the transfer is complete 632.

If the object data is to be sent to the submitting client, the data identified by the MOL is transmitted 588 from the object server 212 to the submitting client 220 via the virtual network 218. FIG. 4p presents a flow chart illustrating this process. First, the client 220 requests that the OSC 229 open 634 a transport connection. The MOL associated with the requested data is then passed 636 to the OSC 229. Next, the OSC 229 requests that the federated coordinator 206 open 638 a transport connection, and the MOL is passed 640 to the federated coordinator 206. After validating that the client 220 is authorized to begin a session 642, the federated coordinator 642 initiates a transport session 644 on the object server 212. The federated coordinator 206 obtains the network address of the transport agent, and returns 646 this address to the OSC 229. Thereafter, a transport connection is opened 648 to the transport agent. If the client is authorized to access the requested data 650, the object data is read 652 from the transport agent, and any projection UDFs are executed 654. Thereafter, the object data responsive to the UDF is sent 656 to the client 220, and the OSC 229 is informed 658 that the transfer is complete. Referring back to FIG. 4n, the federated coordinator is informed that the transaction is complete 590, and the status of the request is returned 592 to the client 220 via the ODBC 227. If transaction control was selected (indicating that the changes to the RDBMS 210 and the object server 212 were not to be committed until the data had been transferred to the client), the federated coordinator 201 is requested to end the transaction 596, and commit the changes to the RDBMS 210 and the object server 212. This commit process has already been described. Finally, to complete the transaction, the federated coordinator 206 cleans up the transport connection context 600.

Of course, the steps described above can be used to update or delete data stored on the object server as well. Typically, data in the object server 212 will be updated in response to a SQL UPDATE command. In this situation, the federated coordinator 206 provides the object server 212 with an object identifier, and informs the object server 212 that the data instance associated with this identifier is to be updated. Thereafter, a transport connection is established and the data is transferred as described above. Similarly, object data may be deleted from the object server 212 in response to a SQL DELETE command. This process involves sending the DELETE statement to the federated coordinator 206, where the a SELECT SQL statement is compiled from the DELETE SQL statement. The SELECT statement is passed to the RDBMS 210 for execution to retrieve the rows effected by the DELETE SQL statement. The federated coordinator 206 extracts the object identifiers for those rows, and calls the object server with a list of identifiers to be deleted. Then, the DELETE SQL statement is passed to the RDBMS for execution.

7. Conclusion This concludes the description of the preferred embodiment of the invention. In summary, the present invention discloses a method and apparatus for providing object data stored in a database management system to a requesting client. The method comprises the steps of receiving a database query from the client on a first communication path, transforming the database query into database management system commands, transmitting the database management system commands to the database management system, receiving a response from the database management system, the response including an object locator identifying object data responsive to the database query, compiling an answer set comprising the database management system response, transmitting the answer set to the client on the first communications path, receiving a data request from the client comprising the media object locator, establishing a transport session with the client on a second communication path, and transmitting data identified by the media object locator to the client on the second communication path.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of providing object data accessible to a relational database management system to a client, comprising the steps of:
   receiving a database query from the client on a first communication path;
   transforming the database query into a relational database management system command;
   transmitting the relational database management system command to a relational database management system, the relational database management system comprising a relational database storing an object locator;
   receiving the object locator from the relational database management system;
   transmitting said object locator to the client;
   transmitting data identified by the object locator to the client on a second communication path.

2. A method of providing object data accessible to a relational database management system to a client, comprising the steps of:
   receiving a database query from the client on a first communication path;
   transforming the database query into a relational database management system command and an object server command;
   transmitting the relational database management system command to a relational database management system and the object server command to an object server;
   transmitting an object locator responsive to the database query to the client;
   transmitting data identified by the object locator to the client on a second communication path.

3. A method of providing object data accessible to a database management system to a client, comprising the steps of:
   receiving a query from the client on a first communication path;
   transmitting an object locator responsive to the query to the client;
   receiving a data request from the client comprising the object locator; and transmitting data identified by the object locator to the client on a second communication path, the step of transmitting data identified by the object locator to the client on a second communication path comprising the steps of:
      accepting a request to open a transport connection via the second communication path, the request comprising the object locator;
      validating the request to open a transport connection;
      initiating a transport agent in the object server, the transport agent comprising an address; and
      transmitting the address to the client.

4. The method of claim 3 wherein the request to open a transport connection comprises a security component, and the method further comprises the step of validating the request to open the transport connection using the security component.

5. An apparatus for providing object data accessible to a relational database management system to a client, comprising:
   means for receiving a database query from the client on a first communication path;
   means for transforming the database query into a relational database management system command; and
   means for transmitting the relational database management system command to a relational database management system, the relational database management system comprising a relational database storing an object locator;
   means for receiving the object locator from the database management system;
   means for transmitting the object locator to the client;
   means for receiving a data request from the client comprising the object locator; and
   means for transmitting data identified by the object locator to the client on a second communication path.

6. An apparatus for providing object data accessible to a relational database management system to a client, comprising:
   means for receiving a database query from the client on a first communication path;
   means for transforming the database query into a relational database management system command and an object server command;
   means for transmitting the relational database management system command to a relational database management system and the object server command to an object server;
   means for transmitting an object locator responsive to the database query to the client;
   means for receiving a data request from the client comprising the object locator; and
   means for transmitting data identified by the object locator to the client on a second communication path.

7. An apparatus for providing object data accessible to a database management system to a client, comprising:
   means for receiving a query from the client on a first communication path;
   means for transmitting an object locator responsive to the query to the client;
   means for receiving a data request from the client comprising the object locator; and
   means for transmitting data identified by the object locator to the client on a second communication path, the means for transmitting data identified by the object locator to the client on a second communication path comprising:
      means for accepting a request to open a transport connection via the second communication path, the request comprising the object locator;
      means for validating the request to open a transport connection;
      means for initiating a transport agent in the object server, the transport agent comprising an address; and
      means for transmitting the address to the client.

8. The apparatus of claim 7 wherein the request to open a transport connection comprises a security component, and the apparatus further comprises means for validating the request to open the transport connection using the security component.

9. A program storage medium, readable by a computer, embodying one or more instructions executable by the computer to perform method steps for providing object data accessible to a relational database management system to a client, the method steps comprising the steps of:

receiving a database query from the client on a first communication path;

transforming the database query into a relational database management system command;

transmitting the relational database management system command to a relational database management system, the relational database management system comprising a relational database storing an object locator;

receiving the object locator from the database management system;

transmitting the object locator to the client;

receiving a data request from the client comprising the object locator; and transmitting data identified by the object locator to the client on a second communication path.

10. A program storage medium, readable by a computer, embodying one or more instructions executable by the computer to perform method steps for providing object data accessible to a relational database management system to a client, the method steps comprising the steps of:

receiving a database query from the client on a first communication path;

transforming the database query into a relational database management system command and an object server command;

transmitting the relational database management system command to a relational database management system and the object server command to an object server;

receiving an object locator from the database management system;

transmitting the object locator to the client;

receiving a data request from the client comprising the object locator; and transmitting data identified by the object locator to the client on a second communication path.

11. A program storage medium, readable by a computer, embodying one or more instructions executable by the computer to perform method steps for providing object data accessible to a database management system to a client, the method steps comprising the steps of:

receiving a query from the client on a first communication path;

transmitting an object locator responsive to the query to the client;

receiving a data request from the client comprising the object locator; and transmitting data identified by the object locator to the client on a second communication path, the method step of transmitting data identified by the object locator to the client on a second communication path comprising the method steps of:

accepting a request to open a transport connection via the second communication path, the request comprising the object locator;

validating the request to open a transport connection;

initiating a transport agent in the object server, the transport agent comprising an address; and transmitting the address to the client.

12. The program storage device of claim 11 wherein the request to open a transport connection comprises a security component, and the method steps further comprises the step of validating the request to open the transport connection using the security component.

* * * * *